US012748931B2

(12) United States Patent
Hida et al.

(10) Patent No.: US 12,748,931 B2
(45) Date of Patent: Sep. 29, 2026

(54) INFORMATION PROCESSING DEVICE AND INFORMATION PROCESSING METHOD

(71) Applicant: SONY GROUP CORPORATION, Tokyo (JP)

(72) Inventors: Remu Hida, Tokyo (JP); Kanako Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 334 days.

(21) Appl. No.: 18/550,514

(22) PCT Filed: Feb. 10, 2022

(86) PCT No.: PCT/JP2022/005255
§ 371 (c)(1),
(2) Date: Sep. 14, 2023

(87) PCT Pub. No.: WO2022/201943
PCT Pub. Date: Sep. 29, 2022

(65) Prior Publication Data

US 2024/0143942 A1 May 2, 2024

(30) Foreign Application Priority Data

Mar. 26, 2021 (JP) ................................ 2021-054158

(51) Int. Cl.
*G06F 40/40* (2020.01)
*G06F 40/30* (2020.01)
*G06V 30/19* (2022.01)

(52) U.S. Cl.
CPC .............. *G06F 40/40* (2020.01); *G06F 40/30* (2020.01); *G06V 30/19093* (2022.01)

(58) Field of Classification Search
CPC .... G06F 40/40; G06F 40/30; G06V 30/19093
See application file for complete search history.

(56) References Cited

U.S. PATENT DOCUMENTS 10,922,489 B2 * 2/2021 Ray ...................... G06N 3/0455
12,271,694 B1 * 4/2025 Somasundaran ...... G06N 20/00
(Continued)

FOREIGN PATENT DOCUMENTS

JP 2016-057815 A 4/2016
JP 2016-218848 A 12/2016
JP 2017-151902 A 8/2017

OTHER PUBLICATIONS

Callaway, Charles B., and James C. Lester. "Narrative prose generation." Artificial Intelligence 139.2 (2002): 213-252. (Year: 2002).*
Zheng, Yinhe, et al. "Personalized dialogue generation with diversified traits." arXiv preprint arXiv: 1901.09672 (2019). (Year: 2019).*

(Continued)

*Primary Examiner* — Brian L Albertalli
(74) *Attorney, Agent, or Firm* — CHIP LAW GROUP

(57) ABSTRACT

An information processing device according to an embodiment includes: a detection unit (120) that detects an expression based on a feature amount extracted from a text, and character information including information of a character using a learning model learned in advance, the expression being included in the text and indicating the character likeness of the character; and a generation unit (140) that generates a different expression that is different from the expression and indicates the character likeness based on the expression detected by the detection unit and the character information, and presents the generated different expression, and the detection unit relearns the learning model according to a user's reaction to the different expression presented by the generation unit.

17 Claims, 18 Drawing Sheets

(56) References Cited

U.S. PATENT DOCUMENTS

| | | | | |
|---|---|---|---|---|
| 2016/0117311 | A1* | 4/2016 | Maetz | G06F 40/35 704/9 |
| 2018/0065054 | A1* | 3/2018 | Davenport | A63H 3/28 |
| 2018/0121414 | A1* | 5/2018 | Nanavati | G06F 16/3344 |
| 2019/0087414 | A1* | 3/2019 | Narayanan | G06F 16/313 |
| 2019/0107927 | A1* | 4/2019 | Schriber | G06F 40/30 |
| 2020/0019370 | A1* | 1/2020 | Doggett | G10L 15/22 |
| 2020/0125638 | A1* | 4/2020 | Chemmengath | G06N 3/09 |
| 2021/0183381 | A1* | 6/2021 | Petri | G06F 3/0484 |
| 2022/0027575 | A1* | 1/2022 | Pan | G06F 40/35 |
| 2022/0101157 | A1* | 3/2022 | Huck | G06F 40/289 |
| 2023/0135871 | A1* | 5/2023 | Vogel | G06F 40/30 463/31 |

OTHER PUBLICATIONS

Labatut, Vincent, and Xavier Bost. "Extraction and analysis of fictional character networks: A survey." ACM Computing Surveys (CSUR) 52.5 (2019): 1-40. (Year: 2019).*

Sato, et al., "Discussion of Distributed Representation of Speakers with Consideration for Speech-Based Individuality", Proceedings of the 24th Annual Meeting of the Natural Language Processing Society, Mar. 5, 2018, pp. 1280-1283.

Ema, et al., "Sentiment Analysis for Screenplays", The 34th Annual Conference of the Japanese Society for Artificial Intelligence, Jun. 9, 2020, 03 pages.

International Search Report and Written Opinion of PCT Application No. PCT/JP2022/005255, issued on May 17, 2022, 08 pages of ISRWO.

* cited by examiner

FIG.6

| | ITEM | VALUE |
|---|---|---|
| CHARACTER A | NAME | TANAKA TAKASHI |
| | FIRST PERSON | I (BOKU) |
| | SECOND PERSON | YOU (KIMI) |
| | CHARACTER NAME | HIROSHI: HIROSHI<br>JUN: SENIOR (SENPAI) |
| | ENDING OF WORD | I THINK. |
| | FAVORITE WORD | APPLE |
| | DISLIKABLE FOOD | NATTO |
| | ... | ... |
| CHARACTER B | NAME | SATO HIROSHI |
| | FIRST PERSON | I (ORE) |
| | SECOND PERSON | HEY MAN (OMAE) |
| | CHARACTER NAME | TAKASHI: TAKASHI<br>JUN: SENIOR (SENPAI) |
| | ENDING OF WORD | I GUESS., YOU KNOW. |
| | FAVORITE WORD | MELON |
| | DISLIKABLE FOOD | OKRA |
| | ... | ... |
| | ... | ... |

FIG.7

| TERM | EXPLANATION |
|---|---|
| STUDENT COUNCIL ELECTION | ELECTION HELD IN SEPTEMBER EVERY YEAR TO SELECT NEXT STUDENT COUNCIL PRESIDENT. CANDIDATES NEED TO BECOME MEMBER OF STUDENT COUNCIL. |
| SPORTS FESTIVAL | EVENT HELD IN JUNE EVERY YEAR.<br>CLASSES ARE CLASSIFIED INTO SEVEN RAINBOW COLORS. |
| BACK COURTYARD | SMALL PLAYGROUND IN SOUTH FROM PLACE OF COURTYARD. |
| PROFICIENCY TEST | PROFICIENCY TEST HELD EVERY SEMESTER.<br>TOP 10 RECORDS ARE PRESENTED. |
| ×× STATION | STATION THAT IS NEAREST TO ×× HIGH SCHOOL AND TO WHICH TWO TRAIN LINES RUN.<br>GOOD LOCATION AT 10 MINUTE'S WALK TO △△. |
| ... | ... |

FIG.8

○SCENE

○DATE SEPTEMBER 2010

○PLACE CLASSROOM OF HIGH SCHOOL,
ANOTHER WORLD CONNECTED TO CLASSROOM

○CHARACTERS

○TAKASHI, HIROSHI, TEACHER, JUN

○SUMMARY

1. CLASSROOM BEFORE FIRST LESSON ON ONE DAY OF SEPTEMBER
TAKASHI AND HIROSHI GET BORED WITH ANOTHER ORDINARY DAY, AND TALK ABOUT THEIR OWN FANTASIES.
2. ...

⋮

9. TWO COME BACK TO REAL CLASSROOM SAFELY 15 MINUTES AFTER
TWO GET SCOLDED BY TEACHER SINCE TEACHER THOUGHT THEY COME LATE TO LESSON.
THEY LAUGH AT EACH OTHER AFTER LESSON, AND LOOK BACK ON WHAT THEY EXPERIENCED IN ANOTHER WORLD.

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/005255 filed on Feb. 10, 2022, which claims priority benefit of Japanese Patent Application No. JP 2021-054158 filed in the Japan Patent Office on Mar. 26, 2021. Each of the above-referenced applications is hereby incorporated herein by reference in its entirety.

FIELD

The present disclosure relates to an information processing device and an information processing method.

BACKGROUND

When a user writes a text such as a script of a movie or an animation or a novel in which characters appear, it is necessary to consider consistency of the characters in the entire text to make the entire text consistent. To achieve consistency of the characters, an expression that is not characteristic of the character is found in a line part of the character or a part indicating a character's speech and behavior in a descriptive part, and is rewritten to an expression that is characteristic of this character.

Such various methods for generating sentences characteristic of a character are conventionally known. Examples of the methods include a method for manually rewriting sentences, a method for automatically converting sentences based on a rule (e.g., Patent Literature 1), a method for converting sentences based on machine learning (e.g., Patent Literature 2), and the like.

CITATION LIST

Patent Literature

Patent Literature 1: JP 2017-151902 A
Patent Literature 2: JP 2016-218848 A

SUMMARY

Technical Problem

The method for manually rewriting the sentences has high accuracy, yet requires high cost in terms of time and cost, and is likely to overlook a part that can be mechanically extracted. On the other hand, the method for automatically converting sentences based on the rule disclosed in Patent Literature 1 and the method for automatically converting sentences based on machine learning disclosed in Patent Literature 2 seemingly requires low cost in terms of time and cost. However, according to these methods for rewriting sentences by automatically converting the sentences, it is necessary to develop rules and machine learning models meeting purposes, and there is a concern that cost increases eventually, and inappropriate sentences such as non-sentences are generated.

An object of the present disclosure is to provide an information processing device and an information processing method that can assist creation of a text in which characters appear at relatively low cost.

Solution to Problem

For solving the problem described above, an information processing device according to one aspect of the present disclosure has a detection unit that detects an expression based on a feature amount extracted from a text, and character information including information of a character using a learning model learned in advance, the expression being included in the text and indicating character likeness of the character; and a generation unit that generates a different expression that is different from the expression and indicates the character likeness based on the expression detected by the detection unit and the character information, and presents the generated different expression, wherein the detection unit relearns the learning model according to a user's reaction to the different expression presented by the generation unit.

BRIEF DESCRIPTION OF DRAWINGS

FIG. 6 is a schematic view illustrating an example of character information that is stored in a character information storage unit that is applicable to the embodiment.

FIG. 7 is a schematic view illustrating an example of work setting information that is stored in a work setting information storage unit that is applicable to the embodiment.

FIG. 8 is a schematic view illustrating an example of plot information that is stored in a plot information storage unit that is applicable to the embodiment.

DESCRIPTION OF EMBODIMENTS

Figure 1:
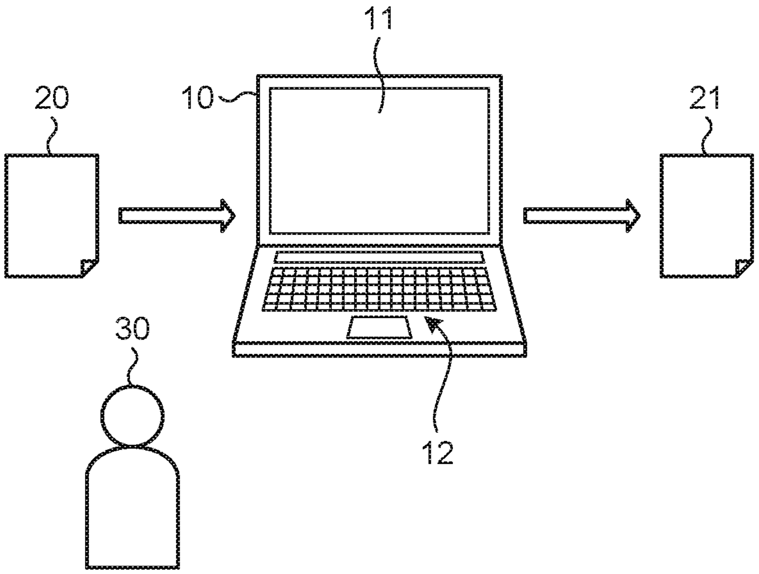
FIG. 1 is a schematic view for describing a use form of an assist tool according to an embodiment.

Hereinafter, an embodiment of the present disclosure will be described in detail with reference to the drawings. Note that, in the following embodiment, the same components will be assigned the same reference numerals, and redundant description will be omitted.

Hereinafter, the embodiment of the present disclosure will be described in the following order.

1. Outline of Embodiment of Present Disclosure
2. Example of Schematic Configuration According to Embodiment
3. Details of Configuration According to Embodiment
4. Details of Processing According to Embodiment 4-1. Processing of Preprocessing Unit
4-2. Processing of Detection Unit
4-3. Processing of Comparison Unit
4-4. Processing of Generation Unit
4-5. Feedback According to User's Instruction
4-6. Specific Example of Correction of Expression
4-7. Proposal of Correction According to Transition of Emotion in Story
4-8. Example of UI Screen 5. Modification of Embodiment
6. Other Application Example of Embodiment

1. Outline of Embodiment of Present Disclosure

First, the embodiment of the present disclosure will be schematically described. The present disclosure relates to an assist tool that assists a user to write text content such as a script of a movie, an animation, a drama, or a novel in which characters have a conversation. Here, the characters are not limited to persons, and include anthropomorphized animals, plants, and inorganic materials, simulated personalities assumed to be generated by programs, and the like. Hereinafter, these various characters are collectively referred to as characters.

In general, a script is composed of "lines" and "stage directions", and a novel is composed of "conversational sentences" and "descriptive parts". In the script, a "line" is a sentence for instructing words to be uttered by a character, is often enclosed in parentheses (" "), and is given a character name. A "stage direction" is a sentence for instructing a motion or a behavior of a character. Note that, although the script includes a "slug line" that designates a time and a place, a "slug line" is omitted here.

Furthermore, in a novel, a "conversational sentence" is a sentence indicating a conversation between a character and another character, and a descriptive part is a sentence other than the conversational sentence in the novel. The descriptive part may include a monologue of the character, in other words, a sentence from a character's viewpoint. In a novel, which character makes a conversation indicated by a "conversational sentence" is not clearly indicated in some cases. In many cases, readers of a novel can grasp which character utters a conversation indicated by the "conversational sentence" by following the context.

Note that a context (context) indicates the degree of connection of semantic contents in a flow of a text, and is formed by a logical relationship between a sentence and a sentence or a semantic association between a word and a word in many cases. Even the same word may have a different meaning depending on a context.

FIG. 1 is a schematic view for describing a use mode of an assist tool according to the embodiment. In FIG. 1, an information processing device 10 is, for example, a personal computer (PC), and an information processing program for configuring the assist tool according to the embodiment is installed therein. The information processing device 10 includes a display 11 for presenting image information to a user 30, and an input device 12 that accepts an operation input by the user. FIG. 1 illustrates the example where the information processing device 10 is illustrated as a notebook PC, yet is an example, and the information processing device 10 may be a desktop PC or may be a tablet PC.

Figure 2:
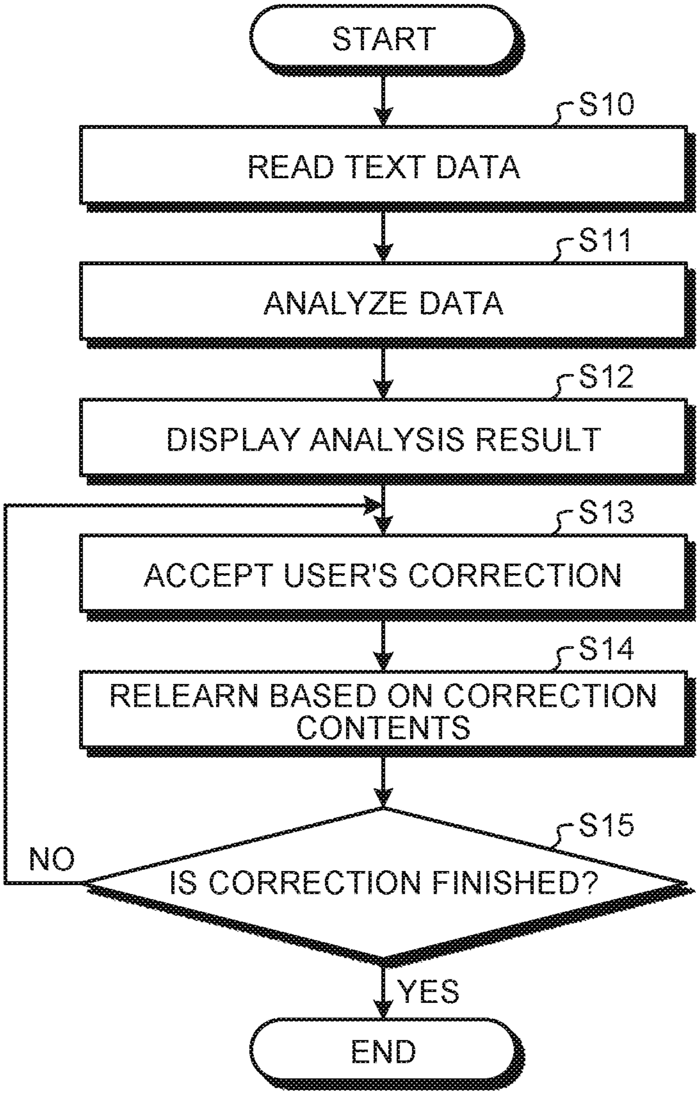
FIG. 2 is an example of a flowchart schematically illustrating processing of the assist tool of an information processing device according to the embodiment.

FIG. 2 is an example of a flowchart schematically illustrating processing of the assist tool in the information processing device 10 according to the embodiment. Hereinafter, in order to avoid complexity, "the processing of the assist tool in the information processing device 10" will be described as "processing of the information processing device 10" or the like.

When, for example, writing a script and creating text data 20 of the written script, the user 30 activates the assist tool according to the embodiment of the present disclosure in the information processing device 10, and inputs the text data 20 to the information processing device 10. Note that the user may create the text data 20 outside the information processing device 10 or using the information processing device 10.

In step S10, the information processing device 10 reads the input text data 20. In next step S11, the information processing device 10 analyzes the text data read in step S10.

For example, during the analysis processing in step S11, the information processing device 10 extracts a stage direction sentence or a descriptive part, and a line sentence from a text included in the text data 20. For example, the information processing device 10 analyzes, for example, the extracted line sentence, and detects an expression that is included in the line sentence, made by a character who utters a line of the line sentence, and matches character likeness. For example, the information processing device 10 is included in the line sentence. An expression characteristic of this character or an expression not characteristic of the character is detected. In the embodiment, the information processing device 10 detects this expression based on, for example, a learning model learned in advance. The information processing device 10 is not limited to this, and may detect this expression according to a predetermined rule.

The information processing device 10 further generates a different expression from the detected expression. In a case where, for example, the expression is an expression characteristic of the character, the information processing device 10 generates this expression more characteristic of the character as the different expression. On the other hand, in a case where the expression is an expression not characteristic of the character, the information processing device 10 generates this expression characteristic of this character as a different expression.

In next step S12, the information processing device 10 displays on the display 11 the expression extracted from the line sentence and a generated different expression from the expression, and presents the expression and the different expression to the user 30.

In next step S13, the information processing device 10 accepts an input of corrections of contents by the user 30 presented in step S12. In a case where, for example, the user 30 has made an input indicating that the user 30 accepts the different expression presented in step S12, the information processing device 10 rewrites and corrects the expression of a corresponding part in a target line sentence to the different expression. Furthermore, in a case where the user 30 has made an input indicating that the user 30 does not accept the different expression presented in step S12, the information processing device 10 rejects the different expression without making any correction.

In next step S14, the information processing device 10 is caused to relearn a learning model used for detecting the expression in step S11 based on a correction result of the user 30 in step S13.

In next step S15, the information processing device 10 determines whether or not to finish correction of the text data 20 read in step S10 in response to the predetermined input of the user 30. In a case where it is determined to finish correction (step S15, "Yes"), the information processing device 10 finishes a series of processing according to this flowchart of FIG. 2, and outputs output data 21 that reflects the correction of the text data 20. On the other hand, in a case where it is determined not to finish the correction (step S15, "No"), the information processing device 10 returns processing to step S13.

Note that, in a case where it is determined in step S15 not to finish the correction, the information processing device 10 may return the processing to step S11, and perform data analysis again on the corrected text data 20 based on the relearned learning model. Furthermore, the information processing device 10 may execute the relearning processing in step S14 after determining to finish the correction in step S15.

As described above, the information processing device 10 according to the embodiment detects an expression matching the character likeness from the line sentence of the text data 20, generates a different expression from the detected expression, and presents the different expression to the user 30. Furthermore, the information processing device 10 detects the expression based on the learning model, and is caused to relearn the learning data using a selection result of the user 30 in response to presentation of the different expression. Therefore, by applying the information processing device 10 according to the embodiment, it is possible to assist creation of a text in which characters appear at relatively low cost.

2. Example of Schematic Configuration According to Embodiment

Figure 3:
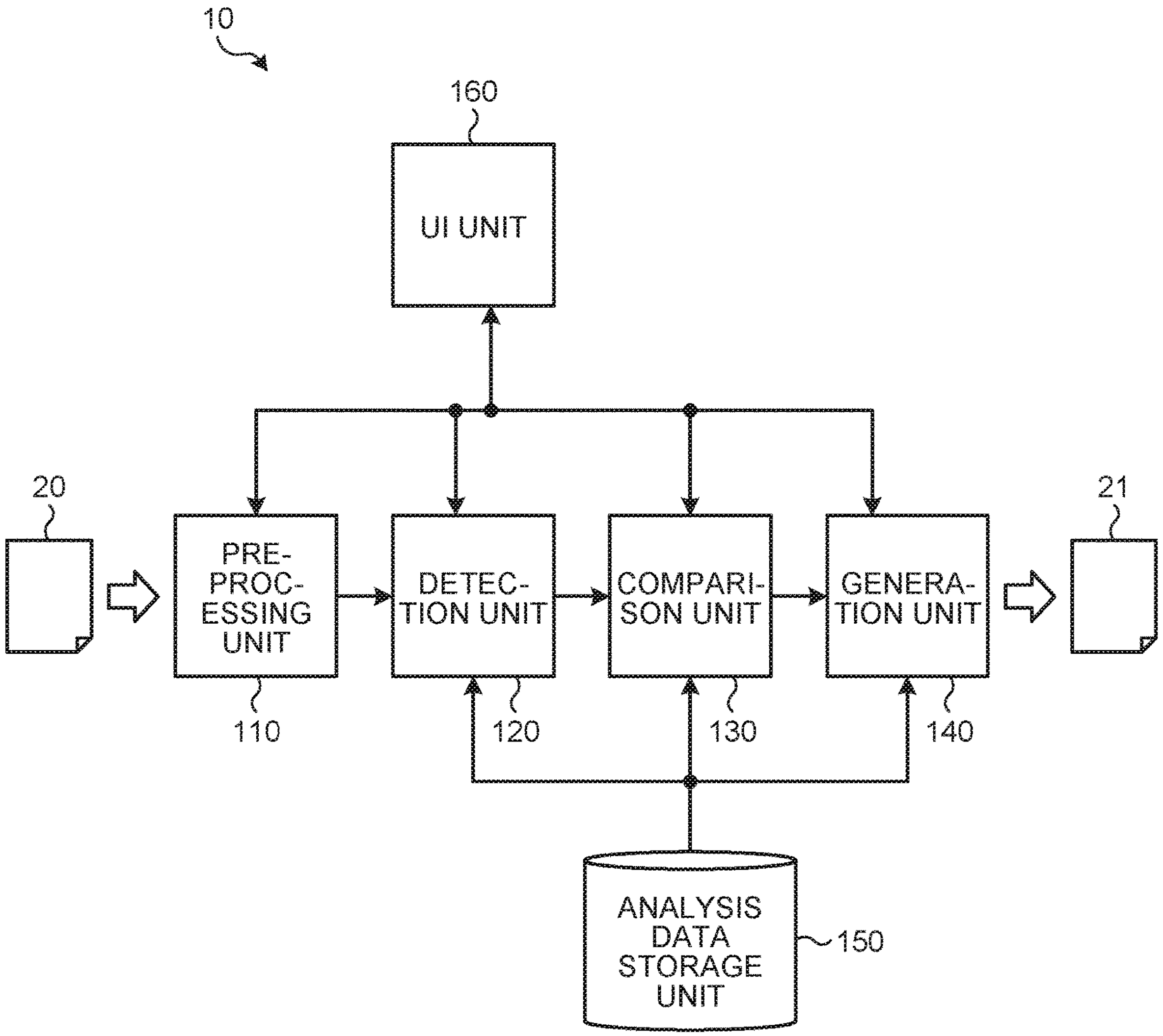
FIG. 3 is an example of a functional block diagram for describing functions of an information processing device 1 according to the embodiment.

Next, an example of a schematic configuration of the information processing device 10 according to the embodiment will be described. FIG. 3 is an example of a functional block diagram for describing the functions of the information processing device 10 according to the embodiment. The information processing device 10 according to the embodiment includes a preprocessing unit 110, a detection unit 120, a comparison unit 130, a generation unit 140, an analysis data storage unit 150, and a UI unit 160.

Among these units, the preprocessing unit 110, the detection unit 120, the comparison unit 130, the generation unit 140, and the UI unit 160 are configured by executing an information processing program according to the embodiment on a Central Processing Unit (CPU) included in the information processing device 10. The preprocessing unit 110, the detection unit 120, the comparison unit 130, the generation unit 140, and the UI unit 160 are not limited to this, and may be partially or entirely configured as hardware circuits that operate in cooperation with each other.

The User Interface (UI) unit 160 generates a user interface for the user 30, and controls the overall operation of this information processing device 10. The analysis data storage unit 150 stores information related to the input text data 20. For example, the analysis data storage unit 150 stores in advance information related to characters appearing in a script or a novel of the text data 20.

The preprocessing unit 110 performs processing of dividing the input text data 20 into stage directions or descriptive parts, and line sentences, and converts line sentences divided from the text data 20 into information suitable for processing of the detection unit 120 at a subsequent stage. The detection unit 120 detects an expression included in a line sentence and indicating the character likeness based on the information transferred from the preprocessing unit 110 and the information stored in the analysis data storage unit 150.

The comparison unit 130 refers to the information stored in the analysis data storage unit 150, and compares the character likeness of the specific expression detected by the detection unit 120 between the plurality of characters. The generation unit 140 generates a different expression from the expression detected by the detection unit 120 based on the comparison result of the comparison unit 130, comparison target expressions, and the information stored in the analysis data storage unit 150, and delivers to the UI unit 160 the different expression and the expression that matches the different expression and is the comparison target of the comparison unit 130. The generation unit 140 rewrites the text data 20 according to the different expression according to the instruction from the UI unit 160. The generation unit 140 outputs the rewritten text data 20 as the output data 21.

Figure 4:
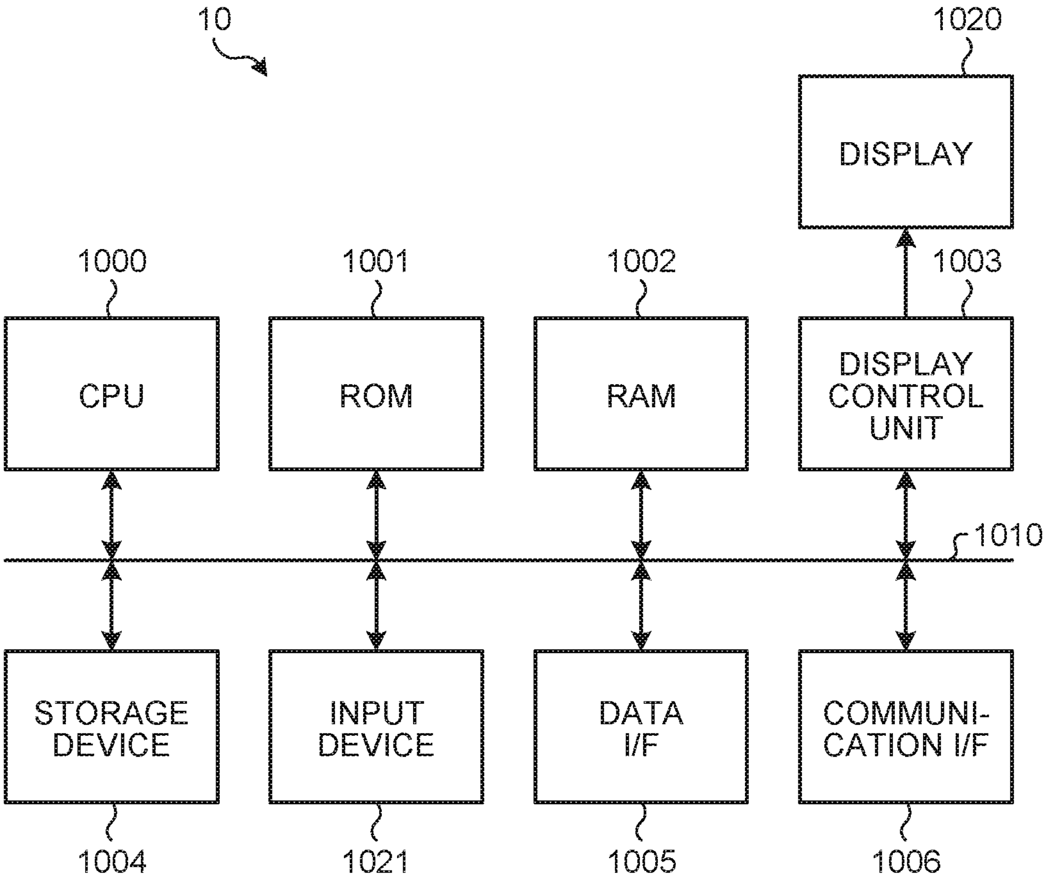
FIG. 4 is a block diagram illustrating an example of a hardware configuration of the information processing device that is applicable to the embodiment.

FIG. 4 is a block diagram illustrating an example of a hardware configuration of the information processing device 10 that is applicable to each embodiment. In FIG. 4, the information processing device 10 includes a CPU 1000, a Read Only Memory (ROM) 1001, a Random Access Memory (RAM) 1002, a display control unit 1003, a storage device 1004, an input device 1021, a data I/F 1005, and a communication I/F 1006 that are communicably connected to each other via a bus 1010.

The storage device 1004 is a non-volatile storage medium such as a hard disk drive or a flash memory. The CPU 1000 controls the entire operation of this information processing device 10 by using the RAM 1002 as a working memory according to programs stored in the ROM 1001 and the storage device 1004.

Note that the above-described analysis data storage unit 150 is formed in, for example, a predetermined storage area in the storage device 1004. The analysis data storage unit 150 is not limited to this, and may be formed in a predetermined storage area of the RAM 1002.

The display control unit 1003 generates a display signal that can be displayed by a display 1020 corresponding to the display 11 in FIG. 1 based on a display control signal generated by the CPU 1000 according to the program. The display control unit 1003 supplies the generated display signal to the display 1020. As a result, a screen based on the display control signal is displayed on the display 1020.

The input device 1021 corresponds to the input device 12 in FIG. 1, and accepts an operation input by the user 30, and delivers a control signal corresponding to the accepted input operation to the CPU 1000. The input device 1021 can include a pointing device such as a mouse or a touch pad, and a letter input device such as a keyboard. Furthermore, the above-described display 1020 and input device 1021 may be integrally formed, and configured as a touch panel that outputs a control signal matching a contact position of the user 30.

The data I/F 1005 is connected to external equipment by wired or wirelessly or by a connector or the like to transmit and receive data. A Universal Serial Bus (USB), Bluetooth (registered trademark), or the like can be applied as the data I/F 1005. The data I/F 1005 is not limited to this, and may include or be connected to a drive device that can read a disk storage medium such as a Compact Disk (CD) or a Digital Versatile Disk (DVD).

The communication I/F 1006 communicates with a network such as the Internet or a Local Area Network (LAN) by wired or wireless communication.

In the information processing device 10, the CPU 1000 executes the information processing program according to the embodiment to configure the above-described preprocessing unit 110, detection unit 120, comparison unit 130, generation unit 140, and UI unit 160 as, for example, modules on a main storage area in the RAM 1002.

The information processing program can be acquired from an outside (e.g., server device) via a network such as the LAN or the Internet by, for example, communication via the communication I/F 1006, and can be installed on the information processing device 10. The information processing program is not limited to this, and may be provided by being stored in a detachable storage medium such as a Compact Disk (CD), a Digital Versatile Disk (DVD), or a Universal Serial Bus (USB) memory.

3. Details of Configuration According to Embodiment

Figure 5:
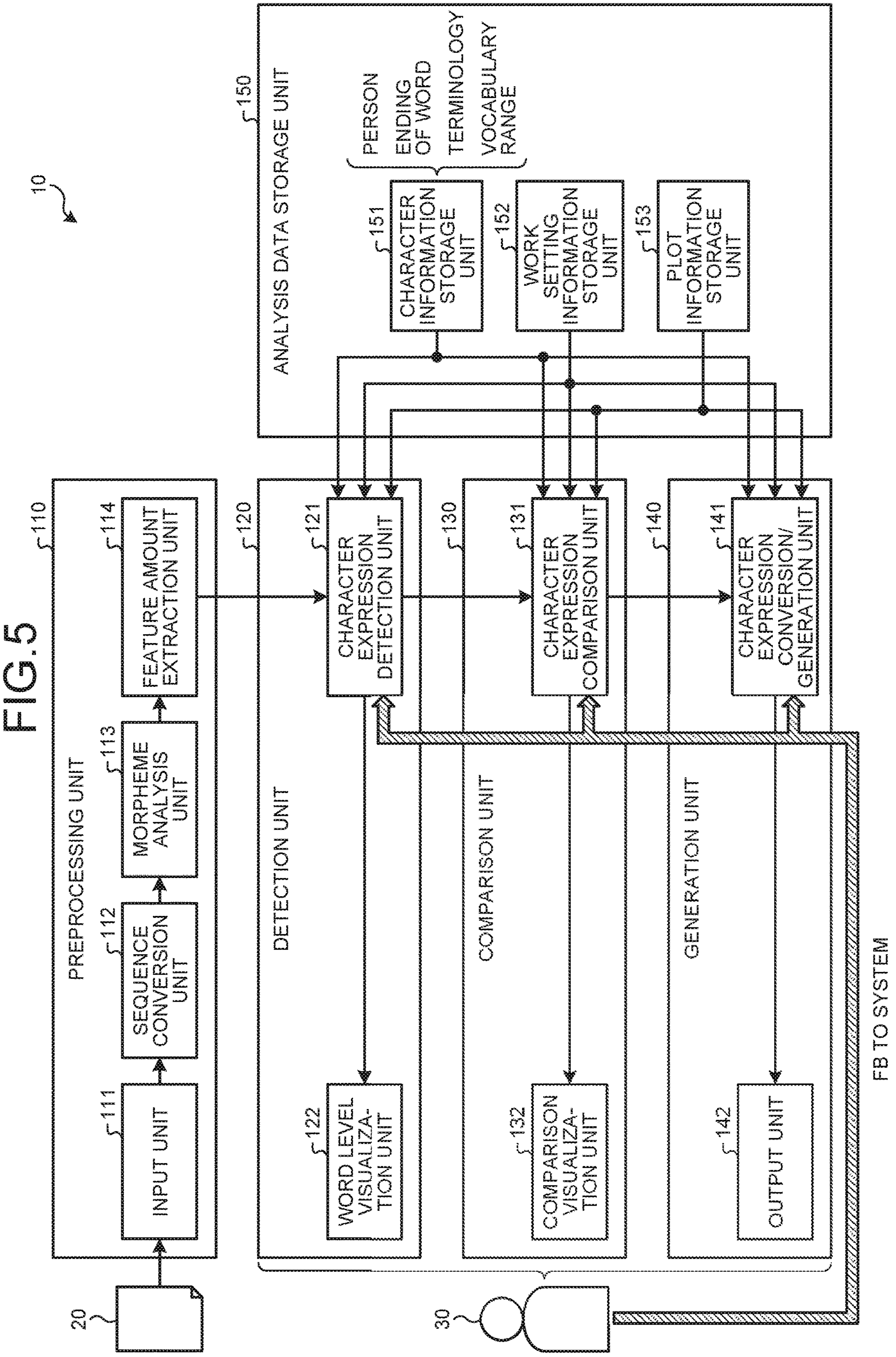
FIG. 5 is an example of a functional block diagram for describing functions of the information processing device according to the embodiment in more detail.

Next, the configuration according to the embodiment will be described in more detail. FIG. 5 is an example of a functional block diagram for describing the functions of the information processing device 10 according to the embodiment in more detail.

In FIG. 5, the preprocessing unit 110 includes an input unit 111, a sequence conversion unit 112, a morphological analysis unit 113, and a feature amount extraction unit 114. The detection unit 120 includes a character expression detection unit 121 and a word level visualization unit 122. The comparison unit 130 includes a character expression detection unit 131 and a comparison visualization unit 132. The generation unit 140 includes a character expression conversion/generation unit 141 and an output unit 142.

The analysis data storage unit 150 includes a character information storage unit 151, a work setting information storage unit 152, and a plot information storage unit 153.

The character information storage unit 151 stores character information that is information related to characters appearing in a target work described by the input text data 20. The character information includes, for example, information that indicates a person, an ending of a word, a terminology, a vocabulary range, and the like used in the speech by the character. The character information storage unit 151 can store these pieces of character information as a feature amount.

FIG. 6 is a schematic view illustrating an example of character information that is stored in the character information storage unit 151 that is applicable to the embodiment. In the example in FIG. 6, an example of character information of the characters A and B is illustrated. The character information is information that characterizes these characters, and, in the example in FIG. 6, each item of "name", "first person", "second person", "character name", "ending of word", "favorite food", dislikable food", and . . . are defined as the character information for each character.

The item "name" among the respective items of the character information indicates the names of the characters, and the character A is "Tanaka Takashi" and the character B is "Sato Hiroshi". Note that the names indicated in the item "name" do not need to be specific names, and may be any names that can be used in the target work and can identify the characters.

The item "first person" is a word used by a character to refer to oneself, and the character A uses "I (Boku)" and the character B uses "I (Ore)". The item "second person" is a word used by a character to refer to an other party of a conversation, and the character A uses "You (Kimi)" and the character B uses "Hey man (Omae)".

The item "character name" is a word used by a character to refer to another specific character, and the character A calls "Hiroshi" as "Hiroshi" and calls "Jun" as "Senior (Senpai)". Furthermore, according to the item "character name", the character B calls "Takashi" as "Takashi" and calls "Jun" as "Senior (Senpai)". The item "ending of word" is a word frequently used by a character as an ending of a word of a conversation, and the character A uses "I think (Desu)" and the character B uses "I guess (Dana)" and "you know (Dayo)".

Furthermore, the item "favorite food" among the items of the character information indicates favorite food of a character, and is "apple" in the case of the character A and "melon" in the case of the character B. The item "dislikable food" indicates dislikable food of a character, and is "natto" in the case of the character A and is "okra" in the case of the character B. As described above, the information indicating a character's preference can also be included in the character information as the information that characterizes this character.

The items of the character information stored in the character information storage unit 151 are not limited to the example illustrated in FIG. 6, and may include more items such as the character's personality, gender, and age.

The work setting information storage unit 152 stores setting information of a target work described by the text data 20. FIG. 7 is a schematic view illustrating an example of work setting information that is stored in the work setting information storage unit 152 that is applicable to the embodiment. The example in FIG. 7 illustrates that the work setting information includes a list of terms used in the work, and explanation of each term. In the example in FIG. 7, "student council election", "sports festival", "back courtyard", "proficiency test", "xx station", and . . . are listed as terms, and specific explanation is given for each term.

For example, based on the work setting information stored in the work setting information storage unit 152, it is possible to grasp the role of each character in the target work indicated in the information stored in the above-described character information storage unit 151. Furthermore, although the list of the terms used in the work has been described above as the work setting information, information included in the work setting information is not limited to this example. For example, a background of a story described in this work may be included in the work setting information.

The plot information storage unit 153 stores plot information of the target work described by the text data 20. FIG. 8 is a schematic view illustrating an example of the plot information stored in the plot information storage unit 153 that is applicable to the embodiment. In FIG. 8, the plot information includes items "scene", "characters", and "summary". The item "scene" includes information of "time" and "place" related to the target work. The item "characters" lists names of characters appearing in the target work.

In FIG. 8, the item "summary" indicates a summary of a story of the target work. As an example, in the item "summary", the story can be divided per scene according to passage of time or contents in the story of the target work, and the contents of the story in each scene can be summarized and described. Furthermore, in the example in FIG. 8, serial numbers 1, 2, . . . , and 9 are assigned to each scene.

The above-described character information, work setting information, and plot information are created in advance by an author of the work or the like, and are stored in the character information storage unit 151, the work setting information storage unit 152, and the plot information storage unit 153.

4. Details of Processing According to Embodiment

Next, the processing according to the embodiment will be described in more detail.

(4-1. Processing of Preprocessing Unit)

Processing of the preprocessing unit 110 according to the embodiment will be described. The text data 20 of the text that describes the target work is input to the input unit 111. The text described by the text data 20 is assumed to be a script or a novel. The input unit 111 transfers the input text data 20 to the sequence conversion unit 112.

In a case where the text data 20 is the script, the sequence conversion unit 112 divides the text data 20 into stage direction sentences and line sentences, and converts the text data 20 into sequences of stage direction sentences and sequences of line sentences. In the case of the script, speaker information is added to the line sentences, and therefore the sequence conversion unit 112 further divides the line sentences per speaker, and converts the line sentences per speaker.

Furthermore, in a case where the text data 20 is the novel, the sequence conversion unit 112 divides descriptive parts and line sentences into sequences of the descriptive parts and sequences of the line sentences. In this case, speaker information associated with each line sentence is not clearly indicated in novels or the like in many cases. Furthermore, sentences from a speaker's viewpoint are included in a descriptive part in many cases, and the sentence from the speaker's viewpoint included in this descriptive part can be regarded as a line sentence indicating a conversation (speech) of the speaker. In a case where the text data 20 is the novel, the sequence conversion unit 112 analyzes the text data 20 together with the descriptive parts and the line sentences by using clustering and a learned model, and divides the text data 20 into the line sentences.

The sequence conversion unit 112 transfers data converted from the text data 20 to the morphological analysis unit 113. The morphological analysis unit 113 performs morphological analysis on the line sentences in the data transferred from the sequence conversion unit 112, and decomposes the line sentences into morphological sequences. The morphological analysis unit 113 transfers each morphological sequence obtained by decomposing the line sentence to the feature amount extraction unit 114. The feature amount extraction unit 114 extracts a feature amount of an expression related to each morphological sequence, from each morphological sequence transferred from the morphological analysis unit 113. The feature amount is expressed by, for example, a multidimensional vector. The feature amount extraction unit 114 transfers the feature amount extracted from each morphological sequence per line sentence to the detection unit 120.

Note that, in the preprocessing unit 110, the feature amount extraction unit 114 can directly extract the feature amount from the data converted by the sequence conversion unit 112.

(4-2. Processing of Detection Unit)

Next, processing of the detection unit 120 according to the embodiment will be described. The feature amount transferred to the detection unit 120 and extracted from each morphological sequence per line sentence is transferred to the character expression detection unit 121. The character expression detection unit 121 detects the character likeness of the expression of the line sentence associated with each feature amount based on each transferred feature amount of the line sentence and the character information stored in the character information storage unit 151.

Here, the character expression detection unit 121 detects the character likeness of the expression using a learning model learned by machine learning. For example, the character expression detection unit 121 uses as labeled data the character information to be stored in the character information storage unit 151 by supervised learning, inputs the feature amount of the expression transferred from the preprocessing unit 110 to the learning model as test data, and obtains a probability of the character likeness of the test data.

As an example, the character information of the character A and the character information of the character B are each used as labeled data, and the feature amount of the expression transferred from the preprocessing unit 110 is input as test data to the learning model. Assuming that the probability P is ($0 \le P \le 1$), the learning model outputs, for example, a probability P(A) that an expression has character A likeness as P(A)=0.8, and a probability P(B) that an expression has character B likeness as P(B)=0.2.

The character expression detection unit 121 obtains the character likeness in the line sentence by using one or both of the following two methods indicated as methods (1) and (2).

Method (1): calculates the character likeness per word in a line sentence.

Method (2): calculates the character likeness per sentence in a line sentence.

The method (1) will be described. According to the method (1), the character expression detection unit 121 obtains the character likeness of the word of the specific character for each feature amount of each morpheme transferred from the feature amount extraction unit 114, and indicating the word of each morphological sequence based on the line sentence of the specific character. The character expression detection unit 121 performs threshold determination on each value (e.g., probability) of the obtained character likeness, and detects a word associated with the character likeness whose value is a threshold or more as a word having character likeness of the specific character.

As an example, it is assumed that, in a line sentence [Takashi "I (Boku) don't eat an apple anyway."] of a character whose name is "Takashi", values (e.g., probabilities) of "I (Boku)" and an ending of the word "anyway." are a threshold or more. In this case, the character expression detection unit 121 assumes that these "I (Boku)" and "anyway." that is the ending of the word are expressions characteristic of the character whose name is "Takashi".

Note that the character expression detection unit 121 may obtain the character likeness in units finer than words, that is, for example, in units of letters. In this case, for example, it is conceivable that the feature amount extraction unit 114 obtains the feature amount based on connection before and after letters, and the character expression detection unit 121 obtains the character likeness based on the feature amount obtained in these units of letters.

The method (2) will be described. According to the method (2), the connection of the entire line sentence is determined based on each morpheme transferred from the feature amount extraction unit 114, and indicating a word in each morphological sequence based on the line sentence of the specific character. In this case, the character expression detection unit 121 obtains a value (e.g., probability) indicating the character likeness of the line sentence by inputting the entire line sentence as test data to, for example, a learning model obtained by learning the character information as labeled data. When, for example, the obtained value is a threshold or more, the character expression detection unit 121 determines the line sentence as an expression characteristic of the specific character.

More specifically, taking the above-described line sentence of "Takashi" [Takashi "I (Boku) don't eat an apple anyway"] as an example, the character expression detection unit 121 obtains a value indicating the character likeness of this entire line sentence. In a case where the value obtained for "Takashi" is the threshold (e.g., 0.8) or more, the character expression detection unit 121 determines this line sentence "I (Boku) don't eat an apple anyway." is an expression characteristic of "Takashi".

The character expression detection unit 121 can further designate whether or not to consider the context for the above-described methods (1) and (2) according to, for example, the user 30 operation. When considering the context, the character expression detection unit 121 obtains the character likeness of the line sentence based on the character of the other party of a line of a target line sentence, a position of the line sentence in an entire text or a chapter including the line sentence, a chronologically preceding line sentence of the line sentence, a stage direction or a descriptive part, and the like. In this case, the character expression detection unit 121 can obtain the character likeness by using a learning model learned based on, for example, a random line sentence, and a text in a predetermined range of a random script or a novel.

In a case where the character likeness is obtained in consideration of the context, the character expression detection unit 121 can present from which element of the context a value (probability) indicating character likeness is calculated. For example, it is conceivable to obtain the character likeness of the expression in the line sentence in consideration of a plurality of dominant elements among a Time, a Place, and an Occasion (TPO), Who, When, Where, What, Why, and How (5W1H), a time zone, and the like in the context. As a specific example, there may be a case where a value indicating the character likeness of a line varies depending on whether a certain line of the character whose name is "Takashi" is a line at night, a line at school, a line at home, or the like. In such a case, the character expression detection unit 121 can present that a ground for obtaining the character likeness is a part indicating "night", a part indicating "school", or a part indicating "home" in a stage direction or a descriptive part.

The character expression detection unit 121 may obtain the character likeness per word or per sentence by further using the work information stored in the work setting information storage unit 152 and the plot information stored in the plot information storage unit 153. The character expression detection unit 121 is not limited to this, and can also convert the character likeness into a numerical value by using various elements (emotions and the like) of a character in addition to the context. For example, even the same line takes different values indicating the character likeness between a case where a character is angry and a case where the character is not angry.

Figure 9A:
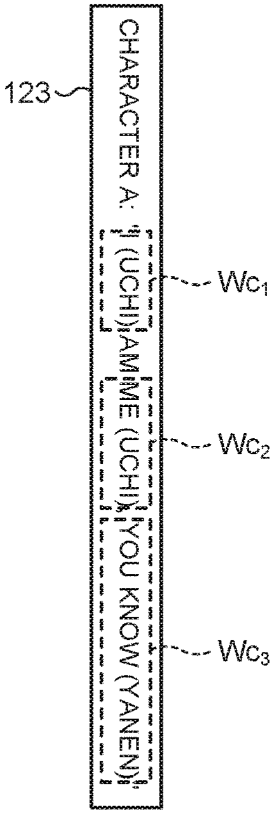
FIG. 9A is a schematic view illustrating an example where a word level visualization unit that is applicable to the embodiment visualizes an expression determined to have character likeness.

In the detection unit 120, the word level visualization unit 122 visualizes, at a word level, the expression that is detected by the character expression detection unit 121 and is determined to have character likeness in the line sentence. FIG. 9A is a schematic view illustrating an example where the word level visualization unit 122 that is applicable to the embodiment visualizes an expression determined to have character likeness. In FIG. 9A, for the line "I (Uchi) am me (Uchi), you know (Yanen)" of the character A (described as the "character A" in FIG. 9A), display 123 highlights and presents expressions $Wc_1$, $Wc_2$, and $Wc_3$ in the line are highlighted and presented as words characteristic of the character A.

The UI unit 160 generates the display 123 based on the information transferred from the detection unit 120. The generated display 123 is displayed on the display 1020. For example, based on the display 123 that highlights the expressions $Wc_1$ to $Wc_3$ in this line sentence, the user 30 can grasp based on what the detection unit 120 has detected the character A likeness.

The character expression detection unit 121 transfers, to the comparison unit 130, the expression detected from the line sentence as an expression having character likeness, and a value (e.g., probability) indicating the character likeness of the expression. These items of data transferred to the comparison unit 130 are transferred to the character expression comparison unit 131.

(4-3. Processing of Comparison Unit)

Next, processing of the comparison unit 130 according to the embodiment will be described. In the comparison unit 130, the character expression comparison unit 131 compares the character likeness of a specific line sentence between a plurality of characters appearing in a target script or novel using the transferred expression and the value indicating the character likeness.

In an example, in a case where the character "Takashi" and the character "Jun" are assumed, and a value indicating "Takashi" likeness (probability of Takashi likeness)=0.8 and a value indicating "Jun" likeness=0.2 are obtained for a line sentence [Takashi "I (Boku) don't eat an apple anyway."] indicating the line of "Takashi", it is possible to determine that this line sentence sufficiently has the "Takashi" likeness. In another example, in a case where a value indicating the "Takashi" likeness=0.6 and a value indicating "Jun" likeness=0.5 are obtained for a line sentence [Takashi "I (Boku) may not go there."] indicating a line of "Takashi", the line sentence is determined as a way of saying similar to the line of "Jun", and it is difficult to determine that the line sentence sufficiently has the "Takashi" likeness.

In a case where a value indicating the character likeness of each of a plurality of characters is given to a certain line sentence, the character expression comparison unit 131 may determine that the line sentence is an expression that is characteristic of the character and has the largest value.

Furthermore, general expressions such as "Yes." and expressions commonly used for a plurality of characters appearing in a work can be excluded from comparison targets of the character expression comparison unit 131. That is, it is preferable to distinguish between a general expression and an expression specific to (characteristic of) a character, and specify a correction range of this assist tool (information processing device 10) as an expression characteristic of the character.

Figure 9B:
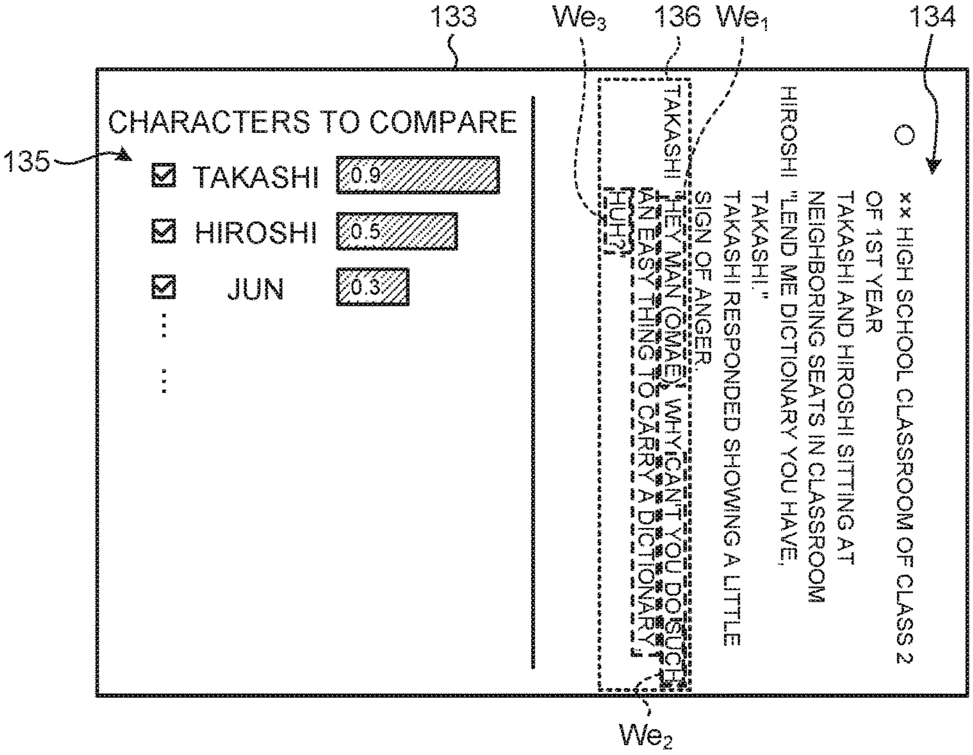
FIG. 9B is a schematic view illustrating an example where a comparison visualization unit that is applicable to the embodiment visualizes a comparison result.

In the comparison unit 130, the comparison visualization unit 132 visualizes a comparison result of the character expression comparison unit 131. FIG. 9B is a schematic view illustrating an example where the comparison visualization unit 132 that is applicable to the embodiment visualizes the comparison result. The UI unit 160 generates display 133 showing the comparison result visualized by the comparison visualization unit 132. The generated display 133 is displayed on the display 1020.

In FIG. 9B, the display 133 includes a target text display unit 134 that displays a text that is a comparison target of the character expression comparison unit 131, and a list unit 135 that displays a list of comparison target characters likewise. In this regard, the script is a target, and the target text display unit 134 includes stage direction sentences and line sentences. This example displays that a line sentence 136 of the character "Takashi" selected by the target text display unit 134 is detected as an expression characteristic of the character "Takashi" based on the expressions Wei, Wee, and Wei.

In FIG. 9B, the list unit 135 displays a list of target characters whose character likeness is compared for the line sentence 136 selected on the target text display unit 134. In this example, the characters "Takashi", "Hiroshi", and "Jun" are selected as the comparison target characters. Furthermore, in the list unit 135, values indicating the character likeness of the respective characters "Takashi", "Hiroshi", and "Jun" for the line sentence 136 are illustrated in association with the respective characters "Takashi", "Hiroshi", and "Jun".

In the example in FIG. 9B, according to the values indicating the character likeness for the line sentence 136, the respective characters "Takashi", "Hiroshi", and "Jun" are the value=0.9, the value=0.5, and the value 0.3, respectively. Accordingly, it is found that the line sentence 136 of the line of the character "Takashi" is an expression really having the character likeness of the character "Takashi". The value is not limited to this, and there may be a case where, even though, for example, a line is the line of "Takashi", the value of this line indicating the character likeness of "Takashi" may be smaller than those of other characters.

The character expression comparison unit 131 transfers, to the generation unit 140, for example, the line sentence 136, each value indicating the character likeness of each of the characters "Takashi", "Hiroshi", and "Jun" in the line sentence 136, and information indicating a part serving as a ground of the value indicating the character likeness in the line sentence 136. These items of data transferred to the generation unit 140 are transferred to the character expression conversion/generation unit 141.

(4-4. Processing of Generation Unit)

Next, processing of the generation unit 140 according to the embodiment will be described. In the generation unit 140, the character expression conversion/generation unit 141 generates a different expression from an expression in a target line sentence based on data including the target line sentence transferred from the character expression comparison unit 131 and the character information stored in the character information storage unit 151. The character expression conversion/generation unit 141 presents a rewritten sentence obtained by rewriting an original sentence with the generated different expression.

In an example, a case will be considered where a value indicating character likeness of a character who utters a line in the target line sentence is, for example, 0.2 or 0.3 and is smaller than a predetermined value (e.g., 0.5), and is determined to have no character likeness. In this case, the character expression conversion/generation unit 141 generates and presents a different expression that is different from the expression in the line sentence and has character likeness. In another example, a case will be considered where the value indicating the character likeness of a character who utters this line in the line sentence 136 is, for example, 0.6 or 0.7 and is larger than the predetermined value, yet does not sufficiently indicate character likeness. In this case, the character expression conversion/generation unit 141 generates and presents a different expression that is different from the expression in the line sentence and has more character likeness.

In an example, in the case of the line "I (Watashi) don't eat an apple anyway." of the character "Takashi", if the character "Takashi" is a boy (description of a boyhood, etc.), the character expression conversion/generation unit 141 can propose rewriting to the line "I (Boku) don't eat an apple anyway.". In this case, the character expression conversion/generation unit 141 can generate a different expression for rewriting the expression of the original line based on the character information of the character stored in the character information storage unit 151. The character expression conversion/generation unit 141 is not limited to this, and can generate a different expression corresponding to the expression based on a dictionary of general phrases.

Furthermore, the character expression conversion/generation unit 141 can propose a different expression from the original expression by setting various items. For example, the character expression conversion/generation unit 141 can generate and propose the different expression in consideration of a context.

In an example, a case will be considered where a context is presented which includes the line "I (Watashi) don't eat an apple anyway." and in which the character "Takashi" speaks to a friend of another character. In this case, the character expression conversion/generation unit 141 generates and proposes, for the line, a line "I (Ore) don't eat an apple anyway." of a different expression having familiarity to the friend.

In another example where a context is considered, in a case where a script or the like describes in a stage direction sentence that "She got angry", the character expression conversion/generation unit 141 can generate and propose a different expression "got mad" for the expression "got angry" indicating an emotion in this description. Furthermore, the character expression conversion/generation unit 141 can generate and propose a different expression in the line sentence related to the description according to the description "She got angry" in the stage direction sentence.

Figure 9C:
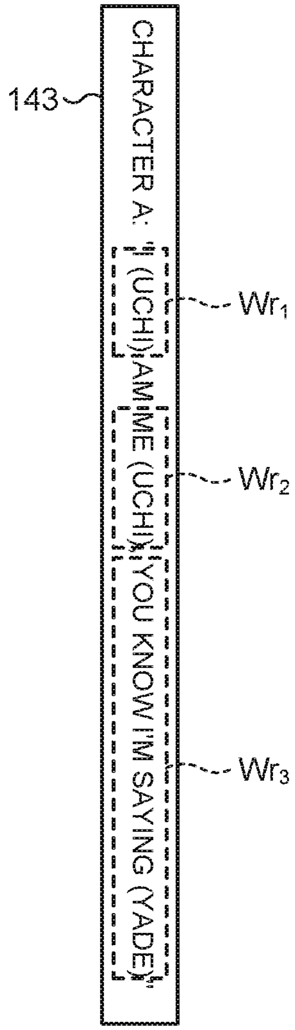
FIG. 9C is a schematic view illustrating an example where an output unit that is applicable to the embodiment visualizes a different expression.

In the generation unit 140, the output unit 142 visualizes the different expression generated by the character expression conversion/generation unit 141. FIG. 9C is a schematic view illustrating an example where the output unit 142 that is applicable to the embodiment visualizes the different expression. The UI unit 160 generates display 143 showing a different expression visualized by the output unit 142. The generated display 143 is displayed on the display 1020.

The example in FIG. 9C corresponds to the above-described example in FIG. 9A. In FIG. 9C, the display 143 proposes and presents a line "I (Uchi) am me (Uchi), you know I'm saying (Yade)" as a different expression from the line "I (Uchi) am me (Uchi), you know (Yanen)" in the display 123 illustrated in FIG. 9A.

In this case, as illustrated in FIG. 9C, no proposal is made for the expressions $Wc_1$ and $Wc_2$ in FIG. 9A, and expressions $Wr_1$ and $Wr_2$ that use the expressions $Wc_1$ and $Wc_2$ as is are illustrated. On the other hand, in the example in FIG. 9C, an expression $Wr_3$ is proposed as a different expression from the expression $Wc_3$ in FIG. 9A.

Note that, in practice, the display 123 in FIG. 9A and the display 143 whose contents corresponds to that of the display 123 are preferably displayed on the same screen as a pair.

(4-5. Feedback According to User's Instruction)

Next, feedback according to a user 30 instruction will be described. For example, the user 30 can instruct whether or not to apply in the display 143 in FIG. 9C the different expression proposed by the character expression conversion/generation unit 141 by, for example, operating the input device 1021. The UI unit 160 controls the detection unit 120, the comparison unit 130, and the generation unit 140 according to instruction contents based on the operation of the input device 1021.

For example, the UI unit 160 updates the display on the display 1020 according to a user's operation to apply the different expression proposed by the generation unit 140 (a specific example will be described later). Furthermore, the UI unit 160 instructs the detection unit 120 to relearn the learning model using the applied different expression according to the user's operation. That is, the user 30 operation on the different expression visualized by the output unit 142 is fed back to the detection unit 120.

Figure 10:
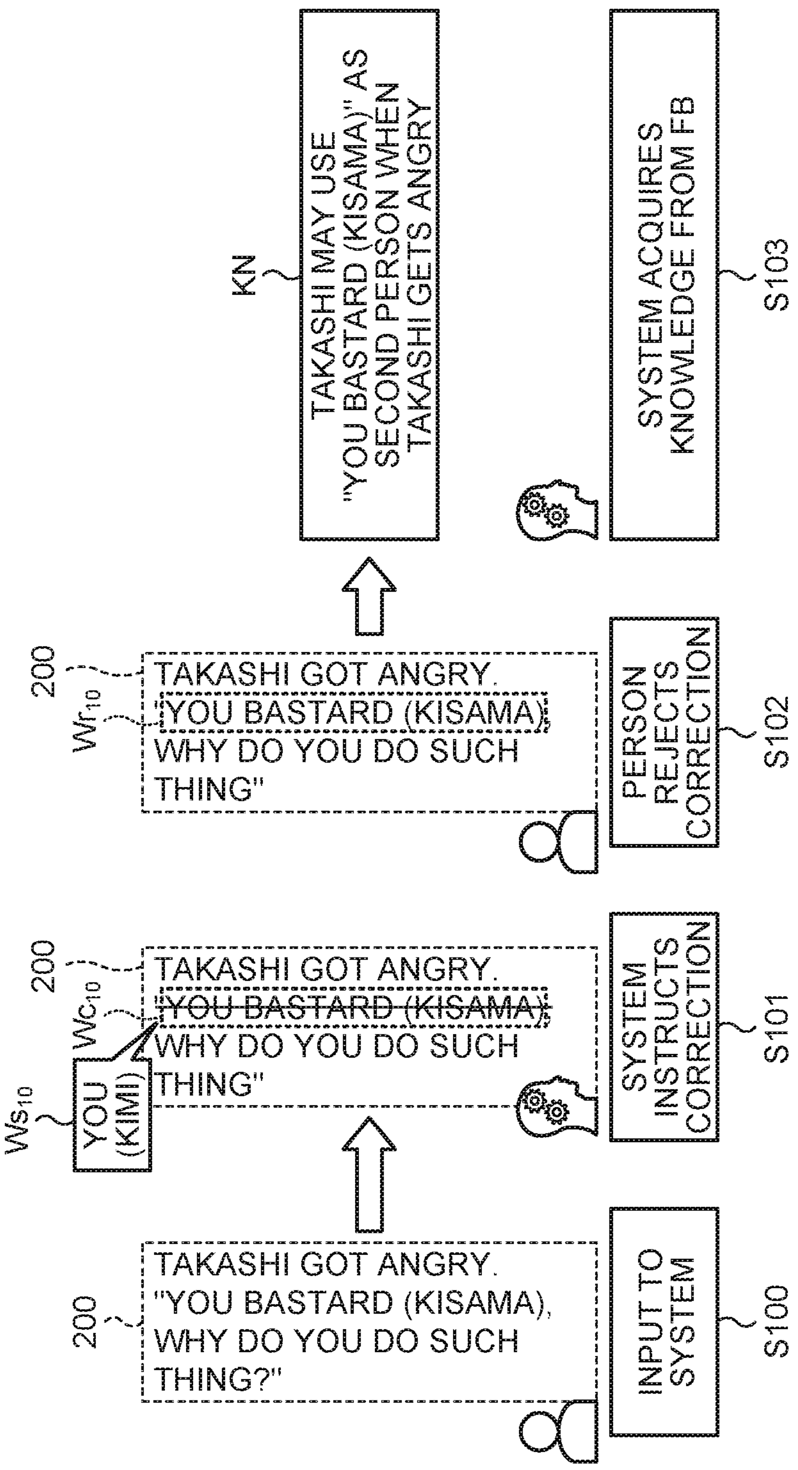
FIG. 10 is a schematic view for describing a first example of correction processing based on feedback of a user's operation according to the embodiment.

FIG. 10 is a schematic view for describing a first example of correction processing based on feedback of a user's operation according to the embodiment. For example, the user 30 inputs text data 200 to the system (the information processing device 10) (step S100).

Here, the text data 200 includes a descriptive part (or a stage direction sentence) and a line sentence. Furthermore, in the text data 200, the line is uttered by the character "Takashi", and the character "Takashi" uses "You (Kimi)" as the second person according to the character information illustrated in FIG. 6. Furthermore, the text data 200 describes a sentence that the character "Takashi" utters as a line "You bastard (Kisama), why do you do such thing?" indicated in a line sentence in a context that the character "Takashi" gets angry.

The system analyzes the input text data 200, divides the text data 200 into the stage direction sentence and the line sentence, analyzes the line sentence, and extracts a feature amount in units of words, sentences, and the like. The system obtains a value indicating the character likeness of the line sentence based on the extracted feature amount, and generates a different expression from the expression in the line sentence according to the obtained value. The system gives presentation that encourages the user 30 to make correction to the different expression (step S101).

In the example in FIG. 10, in the text data 200, a different expression indicated by an expression $Ws_{10}$ is proposed for the original expression indicated by an expression $Wc_{10}$, and correction to the different expression is encouraged. More specifically, while the character "Takashi" uses "You (Kimi)" as the second person, the character "Takashi" uses "You bastard (Kisama)" as the second person in the original expression indicated by the expression $Wc_{10}$. The system proposes the expression $Ws_{10}$ ("You (Kimi)") as the different expression from the expression $Wc_{10}$ based on the character information of the character "Takashi".

In a case where the user 30 rejects the correction in response to the presentation that encourages correction to this different expression (step S102), the system uses the expression $Wc_{10}$ in the original expression as is as the expression $Wr_{10}$ of a correction result. That is, the text data 200 is not corrected. In this way, an instruction by the user 30 is fed back (FB) to the system. According to this feedback, the system obtains knowledge KN that "When Takashi gets angry, Takashi may use "You bastard (Kisama)" as the second person". The system causes the detection unit 120 to relearn the learning model used by the detection unit 120 to detect the expression based on the acquired knowledge KN.

Figure 11:
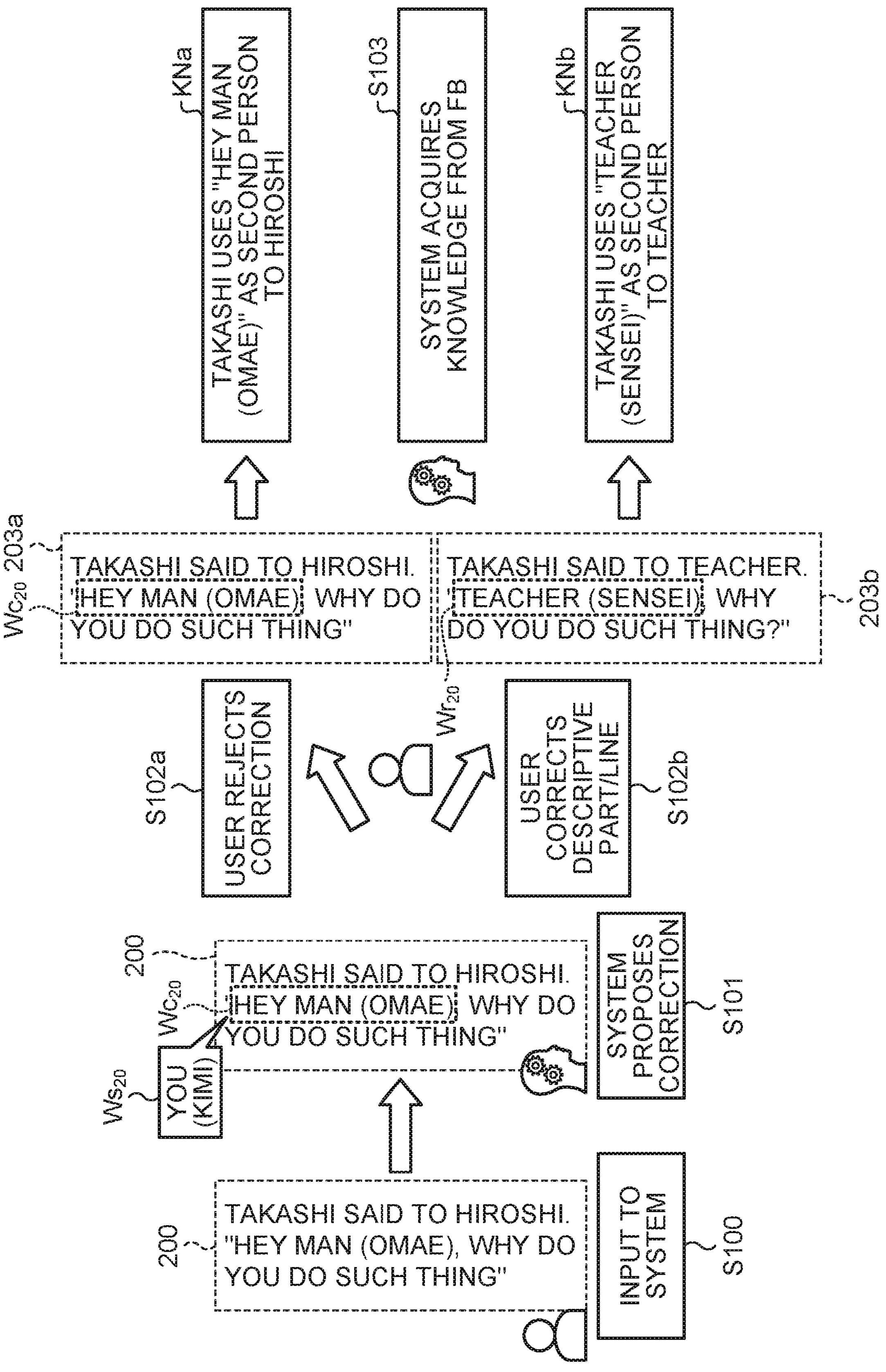
FIG. 11 is a schematic view for describing a second example of correction processing based on feedback of a user's operation according to the embodiment.

FIG. 11 is a schematic view for describing a second example of the correction processing based on feedback of a user's operation according to the embodiment. This second example is an example where the correction contents is changed according to an other party of a conversation in a line sentence. Here, three characters "Takashi", "Hiroshi", and "Teacher (Sensei)" are assumed to appear. The character "Hiroshi" is a close friend of the character "Takashi", and the character "Teacher (Sensei)" is set as a senior person for the character "Takashi".

For example, the user 30 inputs, to the system, the text data 200 including the descriptive part and the line sentence similar to FIG. 10 (step S100). Here, in the text data 200, the line is uttered by the character "Takashi", and the character "Takashi" uses "You (Kimi)" as the second person according to the character information illustrated in FIG. 6. Furthermore, the text data 200 describes a sentence that the character "Takashi" utters as a line "Hey man (Omae), why do you do such thing?" indicated in a line sentence in a context that the character "Takashi" gets angry.

The system analyzes the text data 200 input as described above, obtains a value indicating the character likeness of the line sentence included in the text data 200 based on an analysis result, and generates a different expression from the expression in the line sentence according to the obtained value. The system gives presentation that encourages the user 30 to make correction to the different expression (step S101).

In the example in FIG. 11, similar to step S101 of FIG. 10, a different expression ("You (Kimi)") indicated by an expression $Ws_{20}$ is proposed for the original expression ("Hey man (Omae)") indicated by an expression $Wc_{20}$ in the text data 200 based on the character information of the character "Takashi", and correction to the different expression is encouraged.

In FIG. 11, in response to presentation that encourages correction to this different expression, the user 30 can select one processing of processing of rejecting the proposed correction (step S102*a*) and processing of correcting a descriptive part or a line according to the proposal (step S102*b*).

When the user 30 selects step S102*a*, the system outputs output data 203*a* having the same contents as that of the text data 200 without correcting the text data 200. In this way, an instruction by the user 30 is fed back to the system. According to this feedback, the system acquires knowledge KNa that "Takashi uses "Hey man (Omae)" as the second person for Hiroshi (who is a close friend)". The system causes the detection unit 120 to relearn the learning model used by the detection unit 120 to detect the expression based on the acquired knowledge KNa.

On the other hand, when selecting step S102*b*, the user 30 corrects the descriptive part or the line sentence according to the system's proposal, and outputs output data 203*b* obtained by correcting the text data 200. For example, the user 30 corrects the expression $Wc_{20}$ ("Hey man (Omae)") for which the correction has been proposed to an expression $Wr_{20}$ ("Teacher (Sensei)"). Furthermore, the character "Teacher (Sensei)" is set as the senior person for the character "Takashi", and therefore the user 30 rewrites the other part of the line sentence into a polite language. Furthermore, the user 30 rewrites the expression of the second person in the descriptive part from "Hiroshi" to "Teacher (Sensei)". In this way, an instruction by the user 30 is fed back to the system. According to this feedback, the system acquires knowledge KNb that "Takashi uses "Teacher (Sensei)" as the second person for the teacher (who is the senior person)". The system causes the detection unit 120 to relearn the learning model used by the detection unit 120 to detect the expression based on the acquired knowledge KNb.

Figure 12:
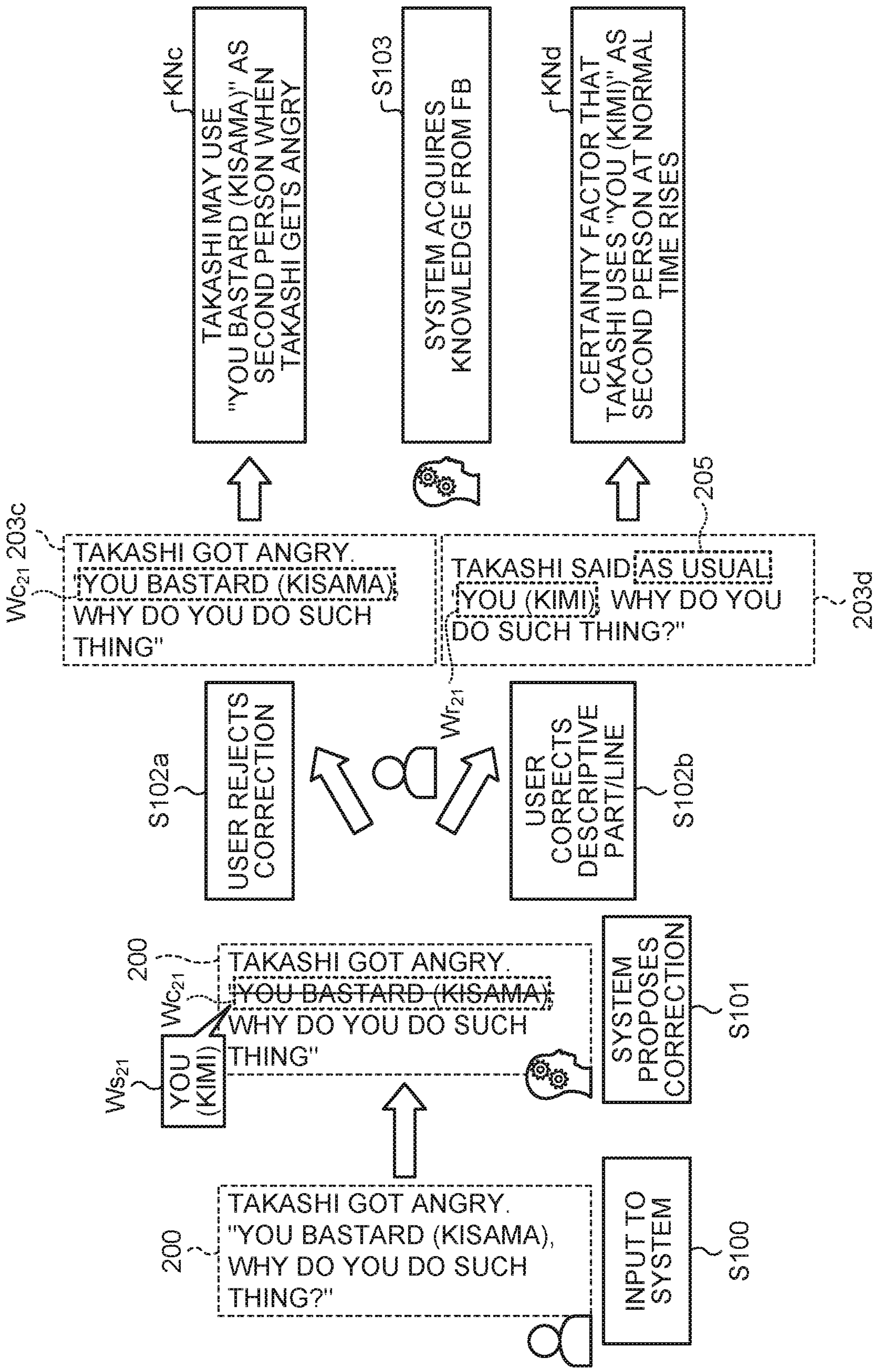
FIG. 12 is a schematic view for describing a third example of correction processing based on feedback of a user's operation according to the embodiment.

FIG. 12 is a schematic view for describing a third example of correction processing based on feedback of a user's operation according to the embodiment. This third example is an example where correction contents is changed according to an emotion of a character who utters a line in a line sentence. Characters that appear and a relationship between the respective characters are the same as those in the second example described with reference to FIG. 11.

For example, similar to FIG. 11, the user 30 inputs the text data 200 including a descriptive part and a line sentence of a line of the character "Takashi" to the system (step S100). Furthermore, the text data 200 describes a sentence that the character "Takashi" utters as a line "You bastard (Kisama), why do you do such thing?" indicated in a line sentence in a context that the character "Takashi" gets angry.

The system analyzes the text data 200 input as described above, obtains a value indicating the character likeness of the line sentence included in the text data 200 based on an analysis result, and generates a different expression from the expression in the line sentence according to the obtained value. The system gives presentation that encourages the user 30 to make correction to the different expression (step S101).

In the example in FIG. 12, similar to step S101 of FIG. 10, a different expression ("You (Kimi)") indicated by an expression $Ws_{21}$ is proposed for the original expression ("You bastard (Kisama)") indicated by an expression $Wc_{21}$ in the text data 200 based on the character information of the character "Takashi", and correction to the different expression is encouraged. In response to presentation that encourages correction to this different expression, the user 30 can select one processing of processing of rejecting the proposed correction (step S102*a*) and processing of correcting a descriptive part or a line according to the proposal (step S102*b*).

When the user 30 selects step S102*a*, the system outputs output data 203*c* having the same contents as that of the text data 200 without correcting the text data 200. In this way, an instruction by the user 30 is fed back to the system. According to this feedback, the system obtains knowledge KNc that "When Takashi gets angry, Takashi may use "You bastard (Kisama)" as the second person". The system causes the detection unit 120 to relearn the learning model used by the detection unit 120 to detect the expression based on the acquired knowledge KNc.

On the other hand, when selecting step S102*b*, the user 30 corrects the descriptive part or the line sentence according to the system's proposal, and outputs output data 203*d* obtained by correcting the text data 200. For example, the user 30 corrects the expression $Wc_{21}$ ("Hey man (Omae)") for which the correction has been proposed to the expression $Wr_{21}$ ("You (Kimi)") according to the proposal. Furthermore, the user 30 corrects the expression "got angry" indicating an emotion of anger in the descriptive part to an expression 205 ("as usual") indicating an emotion at a normal time (not angry). In this way, an instruction by the user 30 is fed back to the system. According to this feedback, the system acquires knowledge KNd indicating that "a certainty factor that Takashi uses "You (Kimi)" as the second person at the normal times is informed". The system causes the detection unit 120 to relearn the learning model used by the detection unit 120 to detect the expression based on the acquired knowledge KNd.

Thus, the system according to the embodiment obtains, based on the learning model, a value whose line sentence is included in the input text data and indicates the character likeness of the character who utters the line in the line sentence. The system generates a different expression from the expression in the line sentence based on the value indicating the character likeness, and presents the different expression to the user. The system feeds back an instruction to a user's instruction for the different expression, and relearns the learning model. Consequently, it is possible to assist creation of a text in which characters appear at relatively low cost.

(4-6. Specific Example of Correction of Expression)

Next, a specific example of correction of an expression according to the embodiment will be described.

(Regarding Proposal for Correction Matching Context)

Figure 13A:
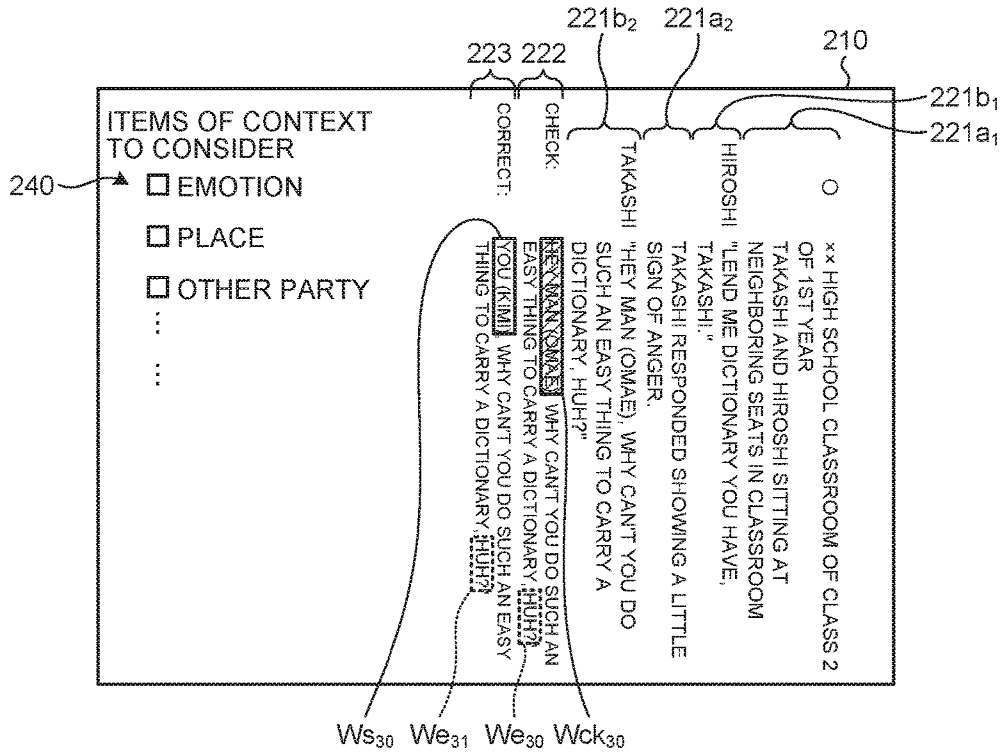
FIGS. 13A and 13B are schematic views illustrating a presentation example of a ground part for proposing correction according to the embodiment.
Figure 13B:
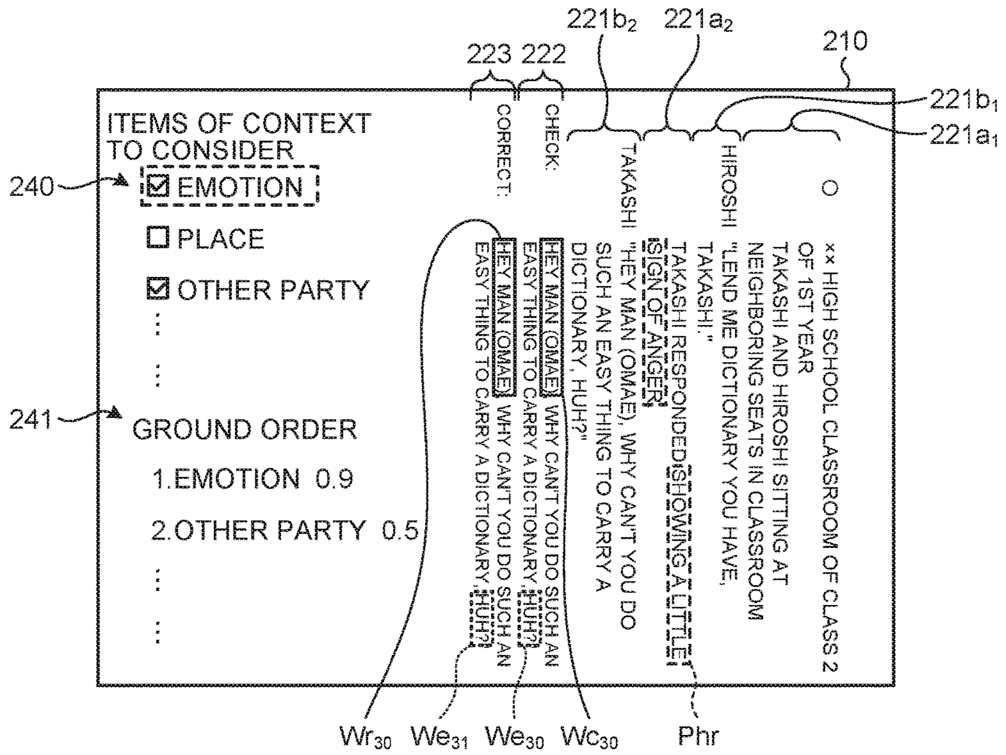

As described above, in the embodiment, the character expression detection unit 121 can present a part in a context that serves as a ground of correction proposed by the system. FIGS. 13A and 13B are schematic views illustrating a presentation example of a ground part for proposing correction according to the embodiment. The UI unit 160 generates a screen 210 illustrated in FIGS. 13A and 13B based on information transferred from the character expression detection unit 121.

In the example in FIGS. 13A and 13B, commonly in FIGS. 13A and 13B, the screen 210 illustrates a text including stage direction sentences 221*a*1 and 221*a*2 and line sentences 221*b*1 and 221*b*2 on the right side. Furthermore, the screen 210 displays a check item 222 and a correction proposal item 223 at the center part. The check item 222 displays a sentence including an expression having low character likeness in the text illustrated on the right side of the screen 210. On the other hand, the correction proposal item 223 displays a sentence for which a different expression has been proposed for the expression having the low character likeness in the sentence indicated by the check item 222. Furthermore, a designation part 240 for designating items of a context to be considered is provided on the left side of the screen 210. In this example, the designation part 240 displays "emotion", "place", 'other party ", and . . . as the items of the context to be considered.

In FIG. 13A, an expression Wck30 ("Hey man (Omae)") of the check item 222 indicates an expression determined by the character expression detection unit 121 to have low character likeness. On the other hand, the correction proposal item 223 indicates an expression Ws30 ("You (Kimi)") that is a different expression that proposes correction to Wck30 at a part corresponding to Wck30. Note that expressions We30 and We31 each indicate an expression that is not included in the character information.

FIG. 13B illustrates an example of a case where the designation part 240 designates "emotion" and "other party". In this case, for example, the character expression detection unit 121 specifies a part of the text relating to the items "emotion" and "other party" in a context based on, for example, a learning model obtained by learning each item, and specifies a part of a line sentence for which correction is proposed, based on the expression of the specified part.

Furthermore, a ground order 241 is displayed at a lower part of the designation part 240 on the left side of the screen 210. When a plurality of items are designated at the designation part 240, the ground order 241 indicates the degree of contribution indicating contribution of each designated item per item as a ground for specifying a part for which correction is proposed. In the example in FIGS. 13A and 13B, the degree of contribution of the item "emotion" is 0.9, the degree of contribution of the item "other party" is 0.5, and the degree of contribution of the item "emotion" is higher than the degree of contribution of the item "other party". For example, based on this degree of contribution, the UI unit 160 highlights the item "emotion" having the highest degree of contribution at the designation part 240, and highlights a phrase Phr corresponding to the item "emotion" in the text illustrated on the right side of the screen 210. In this example, the phrase Phs includes an expression of the emotion of "anger."

Furthermore, for example, the UI unit 160 can change contents of the proposed correction according to this degree of contribution. In the example in FIGS. 13A and 13B, in a state illustrated in FIG. 13A where no item is designated at the designation part 240, correction of the expression Wck30 to the expression Ws30 ("You (Kimi)") that is the different expression is proposed. From this state, as illustrated in FIG. 13B, the items "emotion" and "other party" are designated at the designation part 240. In this example, the degree of contribution of the item "emotion" among the designated items is high, and therefore, for example, the UI unit 160 changes the correction contents proposed for the expression Wck30 from the expression Ws30 of the second person at a normal time to an expression Ws31 of the second person corresponding to the emotion of "anger" based on the phrase Phs corresponding to the item "emotion" in the context.

Consequently, the user 30 can know a ground of correction proposal, and easily decide whether or not to accept the correction proposal.

(Regarding Application of Correction)

Figure 14:
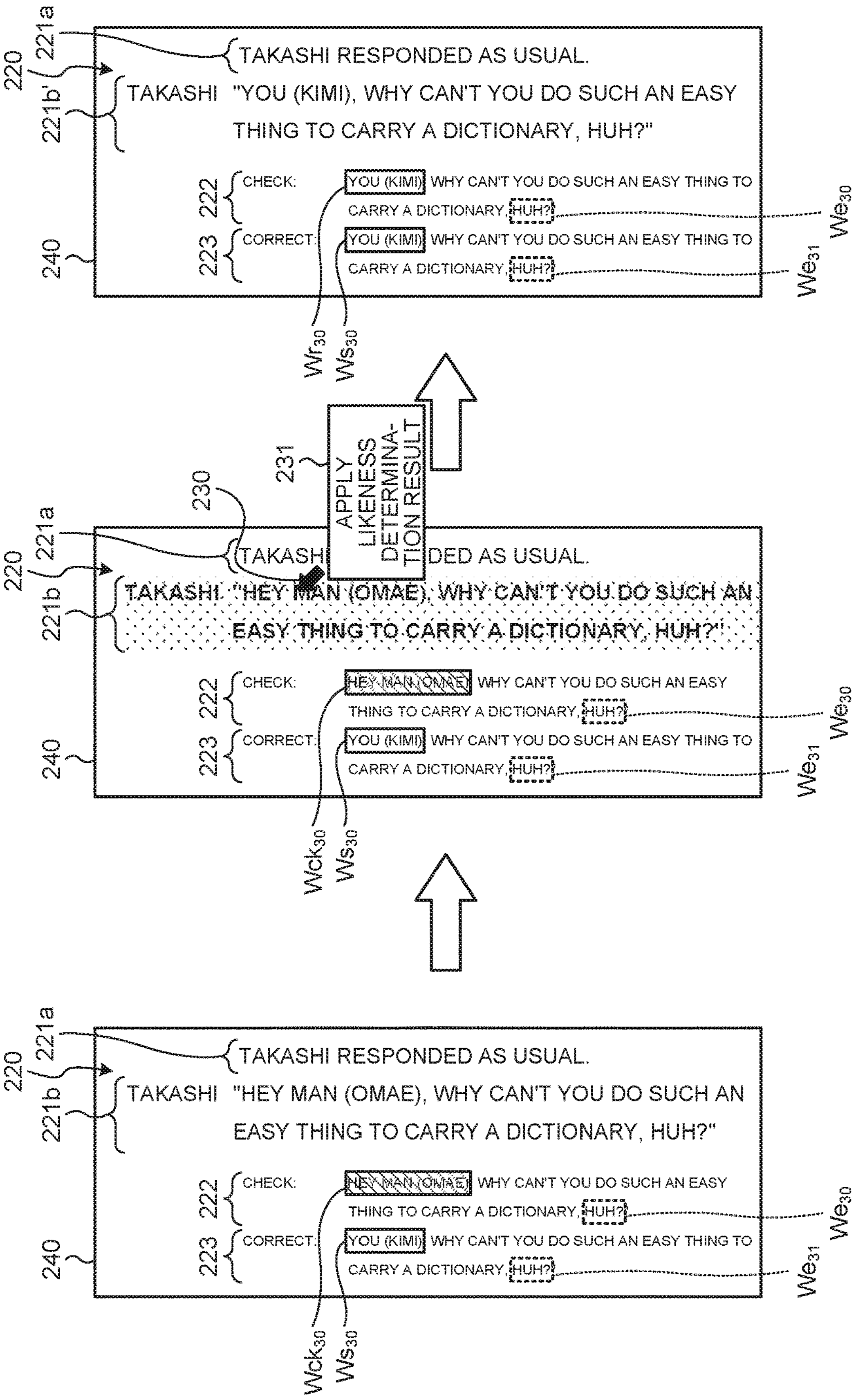

An operation in a case where correction proposed by the system is applied according to the embodiment will be described with reference to FIG. 14. In FIG. 14, each screen 240 extracts and illustrates a right side part of the screen 210 in above-described FIGS. 13A and 13B. That is, the screen 240 displays a text of text data 220 including a stage direction sentence 221*a* and a line sentence 221*b* on the right side. Furthermore, the screen 240 displays the check item 222 and the correction proposal item 223 on the left side. In this example, the line sentence 221*b* is a line "Hey man (Omae), why can't you do such an easy thing to carry a dictionary?" of the character "Takashi".

In the left side of FIG. 14, the expression $Wck_{30}$ ("Hey man (Omae)") of the check item 222 indicates an expression determined by the character expression detection unit 121 to have low character likeness. On the other hand, the correction proposal item 223 displays 30 ("You (Kimi)") that is the different expression for proposing correction to $Wck_{30}$ at a part corresponding to $Wck_{30}$. Note that expressions $We_{30}$ and $We_{31}$ each indicate an expression that is not included in the character information.

An example of an operation in a case where the user 30 accepts proposed correction to the expression $Ws_{30}$ in response to this display of the screen 240 will be described. As illustrated at the center part of FIG. 14, the user 30 moves a cursor 230 using a pointing device such as a mouse, and points at a correction target sentence (the line sentence 221*b* in this example) in the text displayed on the right side of screen 240 using the cursor 230. The UI unit 160 highlights, for example, the sentence (line sentence 221*b*) pointed by the cursor 230.

In this state, the user 30 performs a predetermined operation for accepting the correction to the proposed expression $Ws_{30}$. The predetermined operation is not particularly limited, and is clicking of a right button of the mouse, pushing of a predetermined key of the keyboard, or the like. The UI unit 160 displays an execution button 231 for executing correction according to the predetermined operation of the user 30. When accepting the proposed correction, the user 30 performs an operation of pushing this execution button 231 (e.g., moving the cursor 230 onto the execution button 231 and clicking a left button of the mouse).

When detecting this operation by user 30 on the execution button 231, the UI unit 160 rewrites the corresponding part of the text data 220, and displays a text of the rewritten text data 220. The right side of FIG. 14 illustrates how the text of the rewritten text data 220 is displayed on the screen 240. A corresponding part of a line sentence 221*b*' is rewritten as "You (Kimi), why can't you do such an easy thing to carry a dictionary?" according to the proposed expression $Ws_{30}$. Furthermore, along with this rewriting, the UI unit 160 changes the expression $Wck_{30}$ ("Hey man (Omae)") in the check item 222 to an expression $Wr_{30}$ ("You (Kimi)") that reflects the expression $Ws_{30}$ ("You (Kimi)").

As described above, in the embodiment, processing of reflecting correction proposed by the system in the text data can be executed in several steps.

Note that there is also a case where correction to an expression different from the expression $Ws_{30}$ of proposed correction and the original expression $Wc_{30}$ is performed. In this case, for example, it is conceivable to correct the corresponding part in the correction proposal item 223 as desired, and then perform the above-described operation.

(4-7. Proposal of Correction According to Transition of Emotion in Story)

Next, a proposal for correction matching transition of an emotion in a story according to the embodiment will be described. In the embodiment, the "emotion" that transitions according to a progress of the story can be reflected in an expression Ws for which correction is proposed.

For example, the detection unit 120 analyzes a stage direction sentence or a descriptive part, and a line sentence in the input text data 20 to detect an expression indicating an emotion. Expressions indicating emotions include expressions related to anger, expressions related to laughter, expressions related to impressions, and the like. The detection unit 120 detects for the text data 20 an expression indicating an emotion based on a word, a phrase, and moreover a context. The detection unit 120 sets a value (referred to as an emotion value) indicating the degree of activation of an emotion to the expression indicating the emotion detected from the text data 20. The detection unit 120 may detect the expression indicating the emotion and set the emotion value based on a specific keyword indicating the emotion, or using a learning model obtained by learning the expression indicating the emotion.

Figure 15:
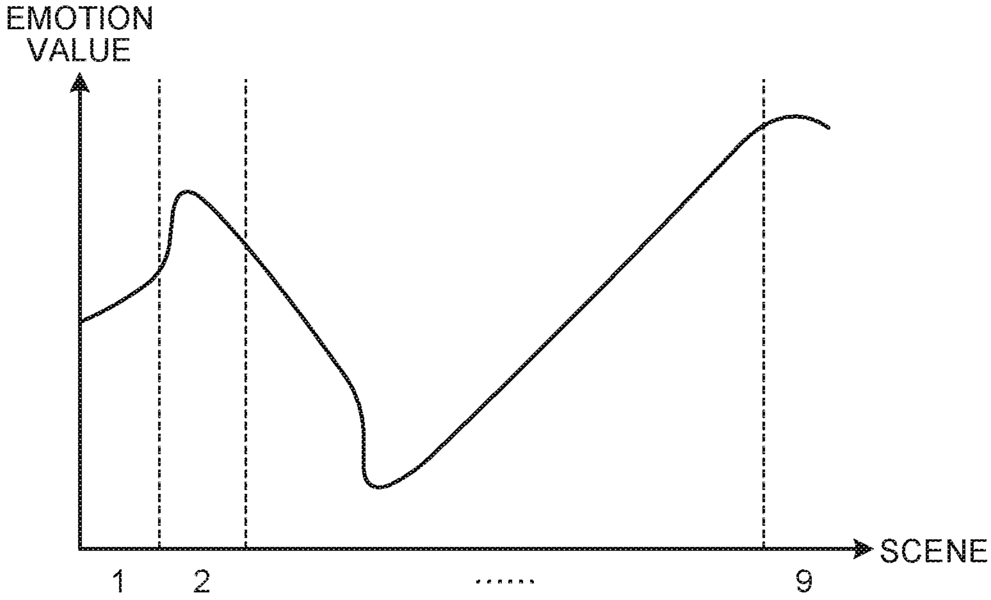

FIG. 15 is a graph illustrating an example of transition of an emotion value in each scene of the story. The horizontal axis indicates a progress of the scene in the story, and the vertical axis indicates an emotion value. At a part where the emotion value is high and the emotion is activated in the story, an expression that expresses a more intense emotion compared to the expression of an emotion at a normal time is used as the expression Ws that proposes the correction. By contrast with this, at a part where the emotion value is low and the emotion is inactive in the story, an expression that expresses a more suppressed emotion than the expression of the emotion at the normal time is used.

As an example, expressions indicating emotions are classified into about five levels from inactive expressions to activated expressions. It is conceivable to use three to five levels of expressions for a scene with a high emotion value, one to three levels of expressions for a scene with a low emotion value, and two to four levels of expressions for a scene with an intermediate emotion value as the expressions of proposed correction.

Consequently, by properly using the expression of proposed correction according to an emotion per scene, it is possible to propose more appropriate correction, and it is possible to more efficiently execute, on a correction result, relearning of a learning model according to feedback.

(4-8. Example of UI Screen)

Figure 16:
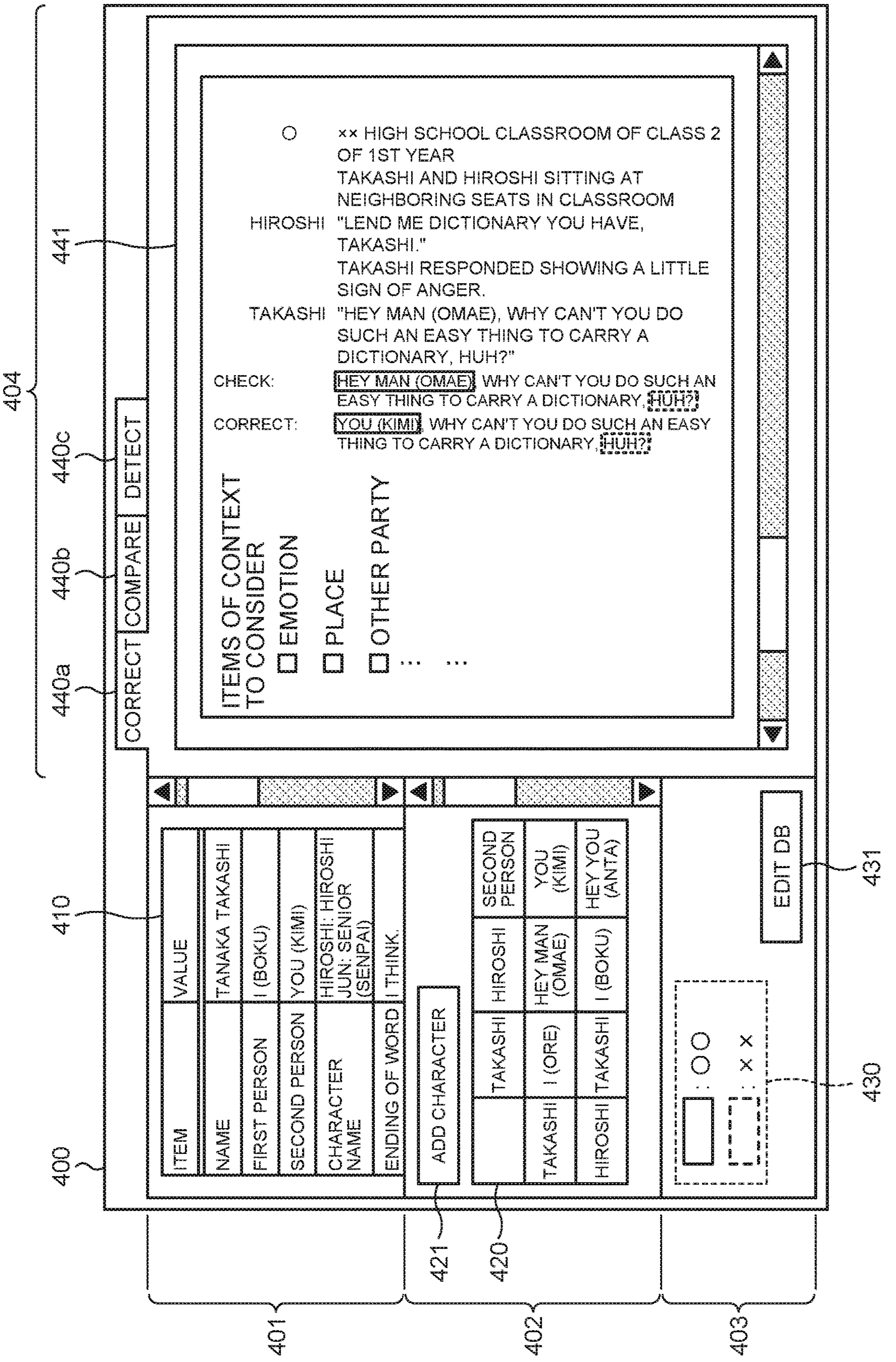

Next, an example of a UI screen that is applicable to the embodiment will be described. FIG. 16 is a schematic view illustrating an example of the UI screen that is applicable to the embodiment. A UI screen 400 illustrated in FIG. 16 is generated by the UI unit 160, and is displayed on, for example, the display 1020.

When, for example, the assist tool according to the embodiment is activated in the information processing device 10 and the text data 20 that is input to the information processing device 10 and in which, for example, a certain work (a script or a novel) is described is read by the assist tool, the UI unit 160 displays the UI screen 400 on, for example, the display 1020.

In FIG. 16, the UI screen 400 includes areas 401 to 404. The area 401 is an area that displays character information 410 stored in the character information storage unit 151 and associated with the input text data 20. The area 402 is, for example, an area that displays a name table 420 that illustrates, as a table, names of own and other characters of each character included in the character information. Furthermore, in this example, the area 402 is further provided with a button 421 for adding a character. By operating this button 421, it is possible to add character information to the character information 410.

The area 402 displays a legend 430 for display in the area 404. Furthermore, the area 402 is further provided with a button 431 for editing information stored in the character information storage unit 151, the work setting information storage unit 152, and the plot information storage unit 153.

The area 404 is provided with tabs 440*a*, 440*b*, and 440*c*, and the UI unit 160 performs, on a display area 441, display corresponding to a designated tab among the tabs 440*a*, 440*b*, and 440*c*. In this example, in a case where the tab 440*a* is designated, the UI unit 160 causes the display area 441 to display the screen presented by the output unit 142 in the generation unit 140. In a case where the tab 440*b* is designated, the UI unit 160 causes the display area 441 to display the screen presented by the comparison visualization unit 132 in the comparison unit 130. Furthermore, the tab 440*c* causes the display area 441 to display the screen presented by the word level visualization unit 122 in the detection unit 120. In the example in FIG. 16, the tab 440*a* is designated, and the screen 210 illustrated in FIG. 13A is displayed in the display area 441.

5. Modification of Embodiment

Next, a modification of the embodiment will be described. In the above-described embodiment, the assist tool according to the present disclosure is mounted and executed in the local information processing device 10. By contrast with this, according to the modification of the embodiment, the assist tool according to the present disclosure is mounted and executed on a server connected to a network.

Figure 17:
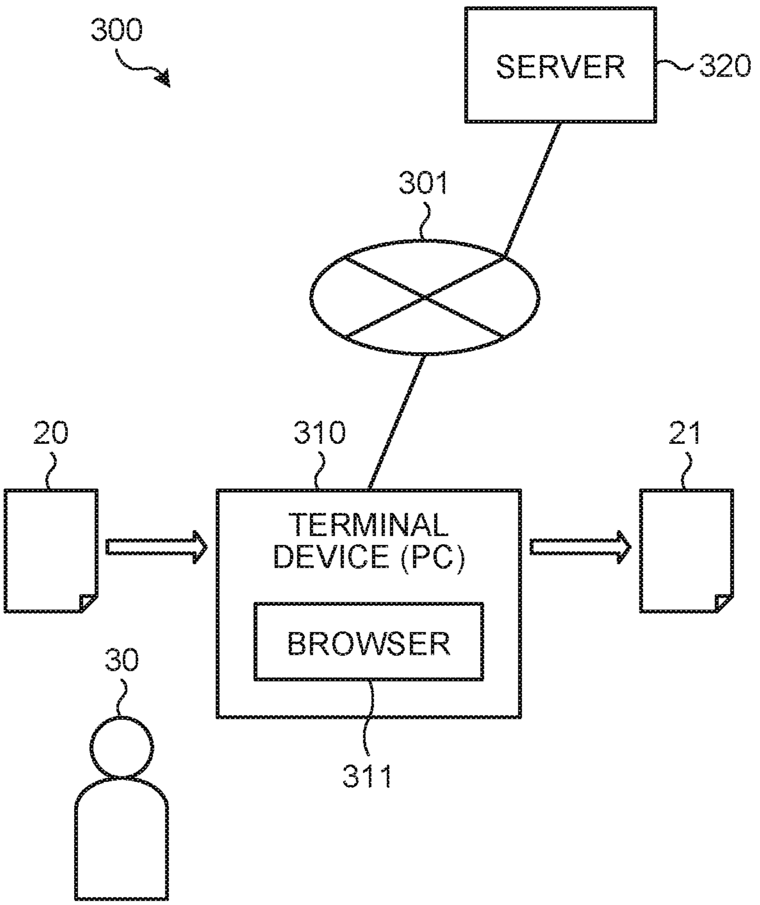

FIG. 17 is a schematic view illustrating an example of a configuration of an information processing system 300 according to the modification of the embodiment. In FIG. 17, the information processing system 300 includes a terminal device 310, and a server 320 connected with the terminal device 310 via a network 301.

The network 301 is, for example, the Internet. The network 301 is not limited to this, and may be a network closed in a predetermined environment such as a Local Area Network (LAN).

The server 302 employs a configuration similar to those of general computers, and includes functions of the preprocessing unit 110, the detection unit 120, the comparison unit 130, the generation unit 140, and the UI unit 160 in the information processing device 10 according to the embodiment illustrated in FIGS. 3 and 5. Furthermore, the server 320 includes the analysis data storage unit 150 illustrated in FIGS. 3 and 5. As described above, the server 320 according to the modification of the embodiment constitutes the assist tool according to the present disclosure.

Note that the server 320 is illustrated as a single computer in the example in FIG. 17, yet is not limited to this example. That is, the server 320 may be configured by distributing functions to a plurality of computers, or may be a server on a cloud network.

The terminal device 310 is, for example, a general information processing device such as a Personal Computer (PC), and includes a browser application 311 (displayed as the browser 311 in FIG. 17) that is used to browse information and is mounted thereon. In the server 320, a screen generated by the UI unit 160 is displayed on a screen of the browser 311 mounted on the terminal device 310. Furthermore, information indicating a user's operation on the browser 311 on which the screen generated by the UI unit 160 is displayed is transferred to the server 320 via the network 301.

According to such a configuration, the user 30 inputs the text data 20 to the terminal device 310. In the terminal device 310, the browser 311 transfers the input text data 20 to the server 320 via the network 301. The server 320 analyzes the text data 20 as described above, and generates a proposal for correction of an expression or the like. The UI unit 160 generates display control information for displaying the UI screen 400 described with reference to FIG. 16 based on an analysis result of the text data 20. The server 320 transfers this display control information to the terminal device 310 via the network 301. In the terminal device 310, the browser 311 causes a display of the terminal device 310 to display the UI screen 400 based on the transferred display control information. The terminal device 310 outputs the output data 21 obtained by correcting the text data 20.

Note that, according to this configuration, the text data 20 may be stored in the server 320 in advance. Furthermore, the output data 21 may be also stored in the server 320. In this case, the server 320 can store a plurality of items of the text data 20 and the output data 21 of respectively different works. In the server 320, for example, the detection unit 120 learns the learning model based on the plurality of items of text data 20, so that it is possible to propose more accurate correction.

On the other hand, when storing the items of the text data 20 and the output data 21 of the plurality of users 30, the server 320 needs to strictly manage the text data 20 and the output data 21 of each user 30 per each user 30 to avoid problems such as plagiarism.

Here, the user 30 generally indicates a user related to writing of a certain work, and is not limited to an individual. For example, the user 30 may be a plurality of users who write the same work together, or may be a plurality of users who write a plurality of works included in the same series. In these cases, by using the assist tool according to the present disclosure, it is easy to commonalize an expression per character in each work.

6. Other Application Example of Embodiment

Next, another application example of the embodiment will be described. Although the above description has described that the assist tool according to the embodiment is applied to a script or a novel, the application range of the assist tool is not limited to the script or the novel.

The assist tool according to the embodiment may be applied to a game operated by a program. In this case, appearances, motions, and the like of characters can be captured as input and output to the assist tool. For, for example, a line "I (Ore) am enjoying so much." of the character "Takashi", for example, a line "I (Boku) am enjoying very much." is proposed as a different expression. On the other hand, a meaning itself of the expression "enjoy" included in these lines does not change, so that it is possible to generate and select the appearance or the motion of the character matching the proposed different expression.

Furthermore, in recent years, there are agents that have virtual personality with character properties, official characters of specific brands, and the like. The assist tool according to the embodiment can be applied to posting to a Social Networking Service (SNS), generation of a message, and the like performed by these agents or official characters.

Note that the effects described in the description are merely examples and are not limited, and other effects may be provided.

Note that the present technique can also have the following configurations.

(1) An information processing device comprising:

a detection unit that detects an expression based on a feature amount extracted from a text, and character information including information of a character using a learning model learned in advance, the expression being included in the text and indicating character likeness of the character; and a generation unit that generates a different expression that is different from the expression and indicates the character likeness based on the expression detected by the detection unit and the character information, and presents the generated different expression, wherein the detection unit relearns the learning model according to a user's reaction to the different expression presented by the generation unit.

(2) The information processing device according to the above (1), further comprising a comparison unit that compares for the expression detected by the detection unit the character likeness of each of a plurality of characters based on the character information of each of the plurality of characters, wherein the generation unit generates the different expression indicating the character likeness based on a result of the comparison obtained by the comparison unit.

(3) The information processing device according to the above (2), wherein the comparison unit presents for the expression detected by the detection unit a list of a value indicating the character likeness of each of the plurality of characters.

(4) The information processing device according to the above (3), wherein the generation unit presents the different expression of a character associated with the value selected by the user from the list among the plurality of characters.

(5) The information processing device according to any one of the above (1) to (4), wherein the generation unit generates the different expression based on the expression, the character information, and a context associated with the expression in the text.

(6) The information processing device according to any one of the above (1) to (5), wherein the detection unit detects the expression based on a context of one or more sentences included in the text.

(7) The information processing device according to any one of the above (1) to (6), wherein the detection unit detects the expression in units of at least one of a sentence, a word, and a letter included in the text.

(8) The information processing device according to any one of the above (1) to (7), wherein the character information includes a first person, a second person, and an ending of a word in a line of a character in the text or a character's viewpoint of the character.

(9) The information processing device according to any one of the above (1) to (8), wherein the detection unit highlights and presents a part of the text corresponding to the detected expression.

(10) The information processing device according to any one of the above (1) to (9), wherein the detection unit relearns the learning model according to the reaction to the different expression related to a second person expression in a line of the character included in the text.

(11) The information processing device according to any one of the above (1) to (10), wherein the detection unit relearns the learning model according to the reaction to the different expression related to an emotion expression in the line of the character included in the text.

(12) The information processing device according to any one of the above (1) to (11), wherein the detection unit detects the expression from a line part of the character and a descriptive part of a first person viewpoint of the character in a part other than the line part, the line part and the descriptive part being included in the text.

(13) The information processing device according to any one of the above (1) to (12), wherein the detection unit detects the expression included in the text using a learning model learned in advance based on the feature amount, the character information, and at least one of work setting of a work expressed by the text and plot information indicating a plot of the work.

(14) The information processing device according to any one of the above (1) to (13), wherein the detection unit detects an expression indicating an emotion in a story described in the text, and sets an emotion value to each of scenes in which an expression indicating the emotion is detected in the story, the emotion value indicating an activation degree of the emotion based on the detected expression of the emotion, and the generation unit generates an expression corresponding to the emotion value as the different expression in each of the scenes.

(15) The information processing device according to any one of the above (1) to (14), wherein the generation unit excludes from a target for which the different expression is generated an expression having a predetermined value of the character likeness or less in the expression detected by the detection unit.

(16) An information processing method executed by a processor comprising:

a detection step of detecting an expression based on a feature amount extracted from a text, and character information including information of a character using a learning model learned in advance, the expression being included in the text and indicating the character likeness of the character; and a generation step of generating a different expression that is different from the expression and indicates the character likeness based on the expression detected in the detection step and the character information, and presenting the generated different expression, wherein in the detection step, the learning model is relearned according to a user's reaction to the different expression presented in the generation step.

REFERENCE SIGNS LIST

10 INFORMATION PROCESSING DEVICE
20, 200 TEXT DATA
21, 203*a*, 203*b*, 203*c*, 203*d* OUTPUT DATA
30 USER
110 PREPROCESSING UNIT
111 INPUT UNIT
112 SEQUENCE CONVERSION UNIT
113 MORPHOLOGICAL ANALYSIS UNIT
114 FEATURE AMOUNT EXTRACTION UNIT
120 DETECTION UNIT
121 CHARACTER EXPRESSION DETECTION UNIT
122 WORD LEVEL VISUALIZATION UNIT
130 COMPARISON UNIT
131 CHARACTER EXPRESSION COMPARISON UNIT
132 COMPARISON VISUALIZATION UNIT
134 TARGET TEXT DISPLAY UNIT
135 LIST UNIT
136, 221*b*, 221*b*', 221$b_1$, 221$b_2$ LINE SENTENCE
140 GENERATION UNIT
141 CHARACTER EXPRESSION CONVERSION/GENERATION UNIT
142 OUTPUT UNIT
150 ANALYSIS DATA STORAGE UNIT
151 CHARACTER INFORMATION STORAGE UNIT
152 WORK SETTING INFORMATION STORAGE UNIT
153 PLOT INFORMATION STORAGE UNIT
160 UI UNIT
221*a*, 221$a_1$, 221$a_2$ STAGE DIRECTION SENTENCE
222 CHECK ITEM
223 CORRECTION PROPOSAL ITEM
240 DESIGNATION PART
241 GROUND ORDER
301 NETWORK
310 TERMINAL DEVICE
311 BROWSER
320 SERVER
1020 DISPLAY
1021 INPUT DEVICE

The invention claimed is:

1. An information processing device, comprising:

a central processing unit (CPU) configured to:

learn a learning model;

receive text data;

extract, from the text data, line sentence data and one of stage direction data or descriptive part data;

decompose the line sentence data into morphological sequences;

extract a feature amount from the morphological sequences;

detect a first expression based on;

the learning model, the extracted feature amount, and character information that includes information of a plurality of characters, wherein the first expression is in the line sentence data, and the first expression indicates a respective character likeness of each of the plurality of characters;

generate a second expression based on the first expression and the character information, wherein the second expression is associated with the respective character likeness of each of the plurality of characters, and the second expression is different from the first expression;

present the second expression; and relearn the learning model based on a feedback from a user to the second expression.

2. The information processing device according to claim 1, wherein the CPU is further configured to:

determine, based on the character information, a comparison result between the respective character likeness of the each of the plurality of characters for the first expression; and generate, based on the comparison result, the second expression that is associated with the respective character likeness.

3. The information processing device according to claim 2, wherein the CPU is further configured to present, for the first expression, a list of a plurality of values that indicates the respective character likeness of the each of the plurality of characters.

4. The information processing device according to claim 3, wherein the CPU is further configured to:

receive a selection from the user, wherein the selection is associated with a specific value of the plurality of values, and
the specific value is associated with a specific character of the plurality of characters; and
present the second expression that is associated with the specific character of the plurality of characters.

5. The information processing device according to claim 1, wherein the CPU is further configured to generate the second expression based on at least one of the first expression, the character information, or a context that is associated with the first expression in the line sentence data.

6. The information processing device according to claim 1, wherein the CPU is further configured to detect the first expression based on a context of at least one sentence in the line sentence data.

7. The information processing device according to claim 1, wherein the CPU is further configured to detect the first expression in units of at least one of a sentence in the line sentence data, a word in the line sentence data, or a letter in the line sentence data.

8. The information processing device according to claim 1, wherein the character information includes at least one of information associated with a first person,
information associated with a second person,
an ending of a word in a line of a character, of the plurality of characters, in the line sentence data, or
a viewpoint of the character.

9. The information processing device according to claim 1, wherein the CPU is further configured to:
highlight a part of the line sentence data that corresponds to the first expression; and
present the part of the line sentence data that corresponds to the first expression.

10. The information processing device according to claim 1, wherein
the CPU is further configured to relearn the learning model based on the feedback from the user to the second expression, and
the second expression is associated with a second person expression,
the second person expression is in a line of a specific character of the plurality of characters, and
the line of the specific character is in the line sentence data.

11. The information processing device according to claim 10, wherein
the CPU is further configured to relearn the learning model based on the feedback from the user to the second expression, and
the second expression is further associated with an emotion expression in the line of the specific character.

12. The information processing device according to claim 10, wherein
the CPU is further configured to detect the first expression from a line part of the specific character and the descriptive part, and
the descriptive part is associated with a first person viewpoint of the specific character.

13. The information processing device according to claim 1, wherein the CPU is further configured to detect the first expression in the line sentence data based on at least one of a work setting of the text data or plot information that indicates a plot of the text data.

14. The information processing device according to claim 1, wherein the CPU is further configured to:
detect a plurality of expressions for a plurality of scenes in the text data, wherein
the plurality of expressions indicates a plurality of emotions in a story,
the text data describes the story, and
the plurality of expressions includes the first expression;
set, based on the plurality of expressions, a respective emotion value to each of the plurality of scenes, wherein the respective emotion value indicates a respective activation degree of the each of the plurality of emotions; and
generate a respective expression as the second expression in each of the plurality of scenes, wherein the respective expression corresponds to the respective emotion value.

15. The information processing device according to claim 1, wherein
the CPU is further configured to exclude a specific expression from a target that is associated with the second expression,
the specific expression is associated with a value of the respective character likeness, and
the value of the respective character likeness is less than or equal to a specific value.

16. An information processing method, comprising:
in an information processing device:
learning a learning model;
receiving text data;
extracting, from the text data, line sentence data and one of stage direction data or descriptive part data;
decomposing the line sentence data into morphological sequences;
extracting a feature amount from the morphological sequences;
detecting a first expression based on;
the learning model,
the extracted feature amount, and
character information including information of a plurality of characters, wherein
the first expression is in the line sentence data, and
the first expression indicates a respective character likeness of each of the plurality of characters:
generating a second expression based on the first expression and the character information, wherein
the second expression is associated with the respective character likeness, and
the second expression is different from the first expression:
presenting the second expression; and
relearning the learning model based on a feedback from a user to the second expression.

17. An information processing device, comprising:
a central processing unit (CPU) configured to:
receive text data;
extract a feature amount from the text data;
detect a first expression based on the extracted feature amount, and character information that includes information of a character using a learning model learned in advance, wherein
the first expression is in the text data, and
the first expression indicates a character likeness of the character;
determine, based on the character information of each of a plurality of characters, a comparison result between a respective character likeness of each of the plurality of characters for the first expression;

generate a second expression based on the first expression, the character information, and the comparison result, wherein the second expression is associated with the respective character likeness of each of the plurality of characters, and the second expression is different from the first expression;

present the second expression;

present, for the first expression, a list of a plurality of values that indicates the respective character likeness of the each of the plurality of characters; and relearn the learning model based on a feedback from a user to the second expression.

* * * * *